(12) United States Patent
Takahashi et al.

(10) Patent No.: US 7,503,634 B2
(45) Date of Patent: Mar. 17, 2009

(54) PRINTING APPARATUS, PRINTING PROGRAM, PRINTING METHOD, IMAGE PROCESSING APPARATUS, IMAGE PROCESSING PROGRAM, IMAGE PROCESSING METHOD, AND RECORDING MEDIUM HAVING THE PROGRAM RECORDED THEREIN

(75) Inventors: Toru Takahashi, Matsumoto (JP); Hitoshi Yamakado, Hino (JP)

(73) Assignee: Seiko Epson Corporation (JP)

( * ) Notice: Subject to any disclaimer, the term of this patent is extended or adjusted under 35 U.S.C. 154(b) by 320 days.

(21) Appl. No.: 11/388,253

(22) Filed: Mar. 23, 2006

(65) Prior Publication Data

US 2006/0227160 A1 Oct. 12, 2006

(30) Foreign Application Priority Data

Mar. 24, 2005 (JP) ............................. 2005-085692
Dec. 27, 2005 (JP) ............................. 2005-374469

(51) Int. Cl.
*B41J 2/205* (2006.01)
(52) U.S. Cl. ............................. 347/15; 347/13; 347/42; 347/43; 358/1.2; 358/1.9; 358/3.23
(58) Field of Classification Search .................... 347/13, 347/15, 42, 43; 358/1.2, 1.9, 3.23
See application file for complete search history.

(56) References Cited

U.S. PATENT DOCUMENTS 6,283,571 B1  9/2001  Zhou et al.
6,293,643 B1  9/2001  Shimada et al.
6,328,404 B1  12/2001  Fujimori
2001/0012113 A1*  8/2001  Yoshizawa et al. ........... 358/1.9
2004/0085553 A1*  5/2004  Couwenhoven et al. ...... 358/1.9

FOREIGN PATENT DOCUMENTS

| JP | 01-235655 | 9/1989 |
| JP | 11-151821 | 8/1999 |
| JP | 11-254662 | 9/1999 |
| JP | 2000-79710 | 3/2000 |
| JP | 2000-190470 | 7/2000 |
| JP | 2000-225716 | 8/2000 |
| JP | 2001-177722 | 6/2001 |

* cited by examiner

*Primary Examiner*—Luu Matthew
*Assistant Examiner*—Justin Seo
(74) *Attorney, Agent, or Firm*—Harness, Dickey & Pierce, P.L.C.

(57) ABSTRACT

A printing apparatus includes: an acquirer acquiring M-ary ($M \geq 3$) image data; a divider dividing the acquired image data into pixel areas; a calculator calculating total concentration values of pixels in the divided pixel areas; a storage unit storing a pixel area dot constitution table designating the total concentration value of each calculated pixel area and a dot constitution corresponding to the total concentration value; a calculator calculating a constitution of dots arranged in the pixel area based on the pixel area dot constitution table; a storage unit storing a dot arrangement order table designating an arrangement order of the dots in the pixel area; an arranger arranging the dots having the calculated dot constitution corresponding to the designated dot arrangement order; a generator generating print data by combining the respective pixel areas in which the dots are arranged; and a printer printing based on the print data.

12 Claims, 31 Drawing Sheets

| CONCENTRATION VALUE OF EACH PIXEL (CONCENTRATION AVERAGE VALUE) | TOTAL CONCENTRATION VALUE OF PIXEL AREA | SET DOT CONSTITUTION RATIO | | | ACTUAL NUMBER OF DOTS | | | TOTAL OF ACTUAL NUMBERS OF DOTS (L+M+S) |
|---|---|---|---|---|---|---|---|---|
| | | L | M | S | L | M | S | |
| 0 | 0 | 0 | 0 | 0 | 0 | 0 | 0 | 0 |
| 30 | 1920 | 0 | 0 | 1 | 0 | 0 | 23 | 23 |
| 70 | 4480 | 0 | 1 | 1 | 0 | 18 | 17 | 35 |
| 100 | 6400 | 0 | 2 | 1 | 0 | 30 | 15 | 45 |
| 125 | 8000 | 1 | 1 | 1 | 16 | 15 | 16 | 47 |
| 185 | 11840 | 1 | 1 | 0 | 28 | 28 | 0 | 56 |
| 220 | 14080 | 2 | 0 | 0 | 41 | 21 | 1 | 63 |
| 246 | 15744 | 1 | 0 | 0 | 62 | 0 | 0 | 62 |

| CONCENTRATION VALUE OF EACH PIXEL (CONCENTRATION AVERAGE VALUE) | TOTAL CONCENTRATION VALUE OF PIXEL AREA | SET DOT CONSTITUTION RATIO | | | ACTUAL NUMBER OF DOTS | | | VERIFICATION OF DOT RATIO RESOLVED VALUE (OPTIMUM IF COINCIDING WITH TOTAL CONCENTRATION VALUE) | TOTAL OF ACTUAL NUMBERS OF DOTS (L+M+S) |
|---|---|---|---|---|---|---|---|---|---|
| | | L | M | S | L | M | S | | |
| 0 | 0 | 0 | 0 | 1 | 0 | 0 | 0 | 0 | 0 |
| 1 | 64 | 0 | 0 | 1 | 0 | 0 | 1 | 85 | 1 |
| 2 | 128 | 0 | 0 | 1 | 0 | 0 | 2 | 170 | 2 |
| 3 | 192 | 0 | 0 | 1 | 0 | 0 | 2 | 170 | 2 |
| 4 | 256 | 0 | 0 | 1 | 0 | 0 | 3 | 255 | 3 |
| 5 | 320 | 0 | 0 | 1 | 0 | 0 | 4 | 340 | 4 |
| 6 | 384 | 0 | 0 | 1 | 0 | 0 | 5 | 425 | 5 |
| 7 | 448 | 0 | 0 | 1 | 0 | 0 | 5 | 425 | 5 |
| 8 | 512 | 0 | 0 | 1 | 0 | 0 | 6 | 510 | 6 |
| 9 | 576 | 0 | 0 | 1 | 0 | 0 | 7 | 595 | 7 |
| 10 | 640 | 0 | 0 | 1 | 0 | 0 | 8 | 680 | 8 |
| 11 | 704 | 0 | 0 | 1 | 0 | 0 | 8 | 680 | 8 |
| 12 | 768 | 0 | 0 | 1 | 0 | 0 | 9 | 765 | 9 |
| 13 | 832 | 0 | 0 | 1 | 0 | 0 | 10 | 850 | 10 |
| 14 | 896 | 0 | 0 | 1 | 0 | 0 | 11 | 935 | 11 |
| 15 | 960 | 0 | 0 | 1 | 0 | 0 | 11 | 935 | 11 |
| 16 | 1024 | 0 | 0 | 1 | 0 | 0 | 12 | 1020 | 12 |
| 17 | 1088 | 0 | 0 | 1 | 0 | 0 | 13 | 1105 | 13 |
| 18 | 1152 | 0 | 0 | 1 | 0 | 0 | 14 | 1190 | 14 |
| 19 | 1216 | 0 | 0 | 1 | 0 | 0 | 14 | 1190 | 14 |
| 20 | 1280 | 0 | 0 | 1 | 0 | 0 | 15 | 1275 | 15 |
| 21 | 1344 | 0 | 0 | 1 | 0 | 0 | 16 | 1360 | 16 |
| 22 | 1408 | 0 | 0 | 1 | 0 | 0 | 17 | 1445 | 17 |
| 23 | 1472 | 0 | 0 | 1 | 0 | 0 | 17 | 1445 | 17 |
| 24 | 1536 | 0 | 0 | 1 | 0 | 0 | 18 | 1530 | 18 |
| 25 | 1600 | 0 | 0 | 1 | 0 | 0 | 19 | 1615 | 19 |
| 26 | 1664 | 0 | 0 | 1 | 0 | 0 | 20 | 1700 | 20 |
| 27 | 1728 | 0 | 0 | 1 | 0 | 0 | 20 | 1700 | 20 |
| 28 | 1792 | 0 | 0 | 1 | 0 | 0 | 21 | 1785 | 21 |
| 29 | 1856 | 0 | 0 | 1 | 0 | 0 | 22 | 1870 | 22 |
| 30 | 1920 | 0 | 0 | 1 | 0 | 0 | 23 | 1955 | 23 |
| 31 | 1984 | 0 | 0 | 1 | 0 | 0 | 23 | 1955 | 23 |
| 32 | 2048 | 0 | 0 | 1 | 0 | 0 | 24 | 2040 | 24 |
| 33 | 2112 | 0 | 0 | 1 | 0 | 0 | 25 | 2125 | 25 |

| | | | | | | | | | |
|---|---|---|---|---|---|---|---|---|---|
| 34 | 2176 | 0 | 0 | 1 | 0 | 0 | 26 | 2210 | 26 |
| 35 | 2240 | 0 | 0 | 1 | 0 | 0 | 26 | 2210 | 26 |
| 36 | 2304 | 0 | 0 | 1 | 0 | 0 | 27 | 2295 | 27 |
| 37 | 2368 | 0 | 0 | 1 | 0 | 0 | 28 | 2380 | 28 |
| 38 | 2432 | 0 | 0 | 1 | 0 | 0 | 29 | 2465 | 29 |
| 39 | 2496 | 0 | 0 | 1 | 0 | 0 | 29 | 2465 | 29 |
| 40 | 2560 | 0 | 0 | 1 | 0 | 0 | 30 | 2550 | 30 |
| 41 | 2624 | 0 | 0 | 1 | 0 | 0 | 31 | 2635 | 31 |
| 42 | 2688 | 0 | 0 | 1 | 0 | 0 | 32 | 2720 | 32 |
| 43 | 2752 | 0 | 0 | 1 | 0 | 0 | 32 | 2720 | 32 |
| 44 | 2816 | 0 | 0 | 1 | 0 | 0 | 33 | 2805 | 33 |
| 45 | 2880 | 0 | 0 | 1 | 0 | 0 | 34 | 2890 | 34 |
| 46 | 2944 | 0 | 0 | 1 | 0 | 0 | 35 | 2975 | 35 |
| 47 | 3008 | 0 | 0 | 1 | 0 | 0 | 35 | 2975 | 35 |
| 48 | 3072 | 0 | 0 | 1 | 0 | 0 | 36 | 3060 | 36 |
| 49 | 3136 | 0 | 0 | 1 | 0 | 0 | 37 | 3145 | 37 |
| 50 | 3200 | 0 | 0 | 1 | 0 | 0 | 38 | 3230 | 38 |
| 51 | 3264 | 0 | 0 | 1 | 0 | 0 | 38 | 3230 | 38 |
| 52 | 3328 | 0 | 0 | 1 | 0 | 0 | 39 | 3315 | 39 |
| 53 | 3392 | 0 | 0 | 1 | 0 | 0 | 40 | 3400 | 40 |
| 54 | 3456 | 0 | 0 | 1 | 0 | 0 | 41 | 3485 | 41 |
| 55 | 3520 | 0 | 0 | 1 | 0 | 0 | 41 | 3485 | 41 |
| 56 | 3584 | 0 | 0 | 1 | 0 | 0 | 42 | 3570 | 42 |
| 57 | 3648 | 0 | 1 | 1 | 0 | 14 | 15 | 3655 | 29 |
| 58 | 3712 | 0 | 1 | 1 | 0 | 15 | 14 | 3740 | 29 |
| 59 | 3776 | 0 | 1 | 1 | 0 | 15 | 14 | 3740 | 29 |
| 60 | 3840 | 0 | 1 | 1 | 0 | 15 | 15 | 3825 | 30 |
| 61 | 3904 | 0 | 1 | 1 | 0 | 15 | 16 | 3910 | 31 |
| 62 | 3968 | 0 | 1 | 1 | 0 | 16 | 15 | 3995 | 31 |
| 63 | 4032 | 0 | 1 | 1 | 0 | 16 | 15 | 3995 | 31 |
| ※1→ 64 | 4096 | 0 | 1 | 1 | 0 | 16 | 16 | 4080 | 32 |
| 65 | 4160 | 0 | 1 | 1 | 0 | 16 | 17 | 4165 | 33 |
| 66 | 4224 | 0 | 1 | 1 | 0 | 17 | 16 | 4250 | 33 |
| 67 | 4288 | 0 | 1 | 1 | 0 | 17 | 16 | 4250 | 33 |
| 68 | 4352 | 0 | 1 | 1 | 0 | 17 | 17 | 4335 | 34 |
| 69 | 4416 | 0 | 1 | 1 | 0 | 17 | 18 | 4420 | 35 |
| 70 | 4480 | 0 | 1 | 1 | 0 | 18 | 17 | 4505 | 35 |
| 71 | 4544 | 0 | 1 | 1 | 0 | 18 | 17 | 4505 | 35 |
| 72 | 4608 | 0 | 1 | 1 | 0 | 18 | 18 | 4590 | 36 |
| 73 | 4672 | 0 | 1 | 1 | 0 | 18 | 19 | 4675 | 37 |
| 74 | 4736 | 0 | 1 | 1 | 0 | 19 | 18 | 4760 | 37 |

| | | | | | | | | | |
|---|---|---|---|---|---|---|---|---|---|
| 75 | 4800 | 0 | 1 | 1 | 0 | 19 | 18 | 4760 | 37 |
| 76 | 4864 | 0 | 1 | 1 | 0 | 19 | 19 | 4845 | 38 |
| 77 | 4928 | 0 | 1 | 1 | 0 | 19 | 20 | 4930 | 39 |
| 78 | 4992 | 0 | 1 | 1 | 0 | 20 | 19 | 5015 | 39 |
| 79 | 5056 | 0 | 1 | 1 | 0 | 20 | 19 | 5015 | 39 |
| 80 | 5120 | 0 | 1 | 1 | 0 | 20 | 20 | 5100 | 40 |
| 81 | 5184 | 0 | 1 | 1 | 0 | 20 | 21 | 5185 | 41 |
| 82 | 5248 | 0 | 1 | 1 | 0 | 21 | 20 | 5270 | 41 |
| 83 | 5312 | 0 | 1 | 1 | 0 | 21 | 20 | 5270 | 41 |
| 84 | 5376 | 0 | 1 | 1 | 0 | 21 | 21 | 5355 | 42 |
| 85 | 5440 | 0 | 2 | 1 | 0 | 26 | 12 | 5440 | 38 |
| 86 | 5504 | 0 | 2 | 1 | 0 | 26 | 13 | 5525 | 39 |
| 87 | 5568 | 0 | 2 | 1 | 0 | 26 | 14 | 5610 | 40 |
| 88 | 5632 | 0 | 2 | 1 | 0 | 27 | 12 | 5610 | 39 |
| 89 | 5696 | 0 | 2 | 1 | 0 | 27 | 13 | 5695 | 40 |
| 90 | 5760 | 0 | 2 | 1 | 0 | 27 | 14 | 5780 | 41 |
| 91 | 5824 | 0 | 2 | 1 | 0 | 27 | 15 | 5865 | 42 |
| 92 | 5888 | 0 | 2 | 1 | 0 | 28 | 13 | 5865 | 41 |
| 93 | 5952 | 0 | 2 | 1 | 0 | 28 | 14 | 5950 | 42 |
| 94 | 6016 | 0 | 2 | 1 | 0 | 28 | 15 | 6035 | 43 |
| 95 | 6080 | 0 | 2 | 1 | 0 | 29 | 14 | 6120 | 43 |
| 96 | 6144 | 0 | 2 | 1 | 0 | 29 | 14 | 6120 | 43 |
| 97 | 6208 | 0 | 2 | 1 | 0 | 29 | 15 | 6205 | 44 |
| 98 | 6272 | 0 | 2 | 1 | 0 | 30 | 14 | 6290 | 44 |
| 99 | 6336 | 0 | 2 | 1 | 0 | 30 | 15 | 6375 | 45 |
| 100 | 6400 | 0 | 2 | 1 | 0 | 30 | 15 | 6375 | 45 |
| 101 | 6464 | 0 | 2 | 1 | 0 | 30 | 16 | 6460 | 46 |
| 102 | 6528 | 0 | 2 | 1 | 0 | 31 | 15 | 6545 | 46 |
| 103 | 6592 | 0 | 2 | 1 | 0 | 31 | 16 | 6630 | 47 |
| 104 | 6656 | 0 | 2 | 1 | 0 | 31 | 16 | 6630 | 47 |
| 105 | 6720 | 0 | 2 | 1 | 0 | 32 | 15 | 6715 | 47 |
| 106 | 6784 | 0 | 2 | 1 | 0 | 32 | 16 | 6800 | 48 |
| 107 | 6848 | 0 | 2 | 1 | 0 | 32 | 17 | 6885 | 49 |
| 108 | 6912 | 0 | 2 | 1 | 0 | 33 | 15 | 6885 | 48 |
| 109 | 6976 | 0 | 2 | 1 | 0 | 33 | 16 | 6970 | 49 |
| 110 | 7040 | 0 | 2 | 1 | 0 | 33 | 17 | 7055 | 50 |
| 111 | 7104 | 1 | 1 | 1 | 14 | 14 | 14 | 7140 | 42 |
| 112 | 7168 | 1 | 1 | 1 | 14 | 14 | 14 | 7140 | 42 |
| 113 | 7232 | 1 | 1 | 1 | 14 | 14 | 15 | 7225 | 43 |
| 114 | 7296 | 1 | 1 | 1 | 14 | 15 | 14 | 7310 | 43 |
| 115 | 7360 | 1 | 1 | 1 | 14 | 15 | 15 | 7395 | 44 |

| | | | | | | | | | 400b |
|---|---|---|---|---|---|---|---|---|---|
| 116 | 7424 | 1 | 1 | 1 | 15 | 14 | 14 | 7395 | 43 |
| 117 | 7488 | 1 | 1 | 1 | 15 | 14 | 15 | 7480 | 44 |
| 118 | 7552 | 1 | 1 | 1 | 15 | 15 | 14 | 7565 | 44 |
| 119 | 7616 | 1 | 1 | 1 | 15 | 15 | 15 | 7650 | 45 |
| 120 | 7680 | 1 | 1 | 1 | 15 | 15 | 15 | 7650 | 45 |
| 121 | 7744 | 1 | 1 | 1 | 15 | 15 | 16 | 7735 | 46 |
| 122 | 7808 | 1 | 1 | 1 | 15 | 16 | 15 | 7820 | 46 |
| 123 | 7872 | 1 | 1 | 1 | 15 | 16 | 16 | 7905 | 47 |
| 124 | 7936 | 1 | 1 | 1 | 16 | 15 | 15 | 7905 | 46 |
| 125 | 8000 | 1 | 1 | 1 | 16 | 15 | 16 | 7990 | 47 |
| 126 | 8064 | 1 | 1 | 1 | 16 | 16 | 15 | 8075 | 47 |
| 127 | 8128 | 1 | 1 | 1 | 16 | 16 | 16 | 8160 | 48 |
| 128 | 8192 | 1 | 1 | 1 | 16 | 16 | 16 | 8160 | 48 |
| 129 | 8256 | 1 | 1 | 1 | 16 | 16 | 17 | 8245 | 49 |
| 130 | 8320 | 1 | 1 | 1 | 16 | 17 | 16 | 8330 | 49 |
| 131 | 8384 | 1 | 1 | 1 | 16 | 17 | 17 | 8415 | 50 |
| 132 | 8448 | 2 | 2 | 1 | 18 | 18 | 9 | 8415 | 45 |
| 133 | 8512 | 2 | 2 | 1 | 18 | 18 | 10 | 8500 | 46 |
| 134 | 8576 | 2 | 2 | 1 | 18 | 19 | 9 | 8585 | 46 |
| 135 | 8640 | 2 | 2 | 1 | 18 | 19 | 10 | 8670 | 47 |
| 136 | 8704 | 2 | 2 | 1 | 19 | 18 | 9 | 8670 | 46 |
| 137 | 8768 | 2 | 2 | 1 | 19 | 18 | 10 | 8755 | 47 |
| 138 | 8832 | 2 | 2 | 1 | 19 | 19 | 9 | 8840 | 47 |
| 139 | 8896 | 2 | 2 | 1 | 19 | 19 | 10 | 8925 | 48 |
| 140 | 8960 | 2 | 2 | 1 | 19 | 19 | 10 | 8925 | 48 |
| 141 | 9024 | 2 | 2 | 1 | 19 | 20 | 9 | 9010 | 48 |
| 142 | 9088 | 2 | 2 | 1 | 19 | 20 | 10 | 9095 | 49 |
| 143 | 9152 | 2 | 2 | 1 | 20 | 19 | 10 | 9180 | 49 |
| 144 | 9216 | 2 | 2 | 1 | 20 | 19 | 10 | 9180 | 49 |
| 145 | 9280 | 2 | 2 | 1 | 20 | 20 | 9 | 9265 | 49 |
| 146 | 9344 | 2 | 2 | 1 | 20 | 20 | 10 | 9350 | 50 |
| 147 | 9408 | 2 | 2 | 1 | 20 | 20 | 11 | 9435 | 51 |
| 148 | 9472 | 2 | 2 | 1 | 20 | 21 | 9 | 9435 | 50 |
| 149 | 9536 | 2 | 2 | 1 | 20 | 21 | 10 | 9520 | 51 |
| 150 | 9600 | 2 | 2 | 1 | 21 | 20 | 10 | 9605 | 51 |
| 151 | 9664 | 2 | 2 | 1 | 21 | 20 | 11 | 9690 | 52 |
| 152 | 9728 | 2 | 2 | 1 | 21 | 21 | 9 | 9690 | 51 |
| ※4→ 153 | 9792 | 2 | 2 | 1 | 21 | 21 | 10 | 9775 | 52 |
| 154 | 9856 | 2 | 2 | 1 | 21 | 21 | 11 | 9860 | 53 |
| 155 | 9920 | 2 | 2 | 1 | 21 | 21 | 12 | 9945 | 54 |
| 156 | 9984 | 2 | 2 | 1 | 21 | 22 | 10 | 9945 | 53 |

| | | | | | | | | | |
|---|---|---|---|---|---|---|---|---|---|
| 157 | 10048 | 2 | 2 | 1 | 21 | 22 | 11 | 10030 | 54 |
| 158 | 10112 | 2 | 2 | 1 | 22 | 21 | 11 | 10115 | 54 |
| 159 | 10176 | 2 | 2 | 1 | 22 | 21 | 12 | 10200 | 55 |
| 160 | 10240 | 2 | 2 | 1 | 22 | 22 | 10 | 10200 | 54 |
| 161 | 10304 | 2 | 2 | 1 | 22 | 22 | 11 | 10285 | 55 |
| 162 | 10368 | 2 | 2 | 1 | 22 | 22 | 12 | 10370 | 56 |
| 163 | 10432 | 2 | 2 | 1 | 22 | 23 | 11 | 10455 | 56 |
| 164 | 10496 | 2 | 2 | 1 | 22 | 23 | 11 | 10455 | 56 |
| 165 | 10560 | 2 | 2 | 1 | 23 | 22 | 11 | 10540 | 56 |
| 166 | 10624 | 2 | 2 | 1 | 23 | 22 | 12 | 10625 | 57 |
| 167 | 10688 | 2 | 2 | 1 | 23 | 23 | 11 | 10710 | 57 |
| 168 | 10752 | 2 | 2 | 1 | 23 | 23 | 11 | 10710 | 57 |
| 169 | 10816 | 1 | 1 | 0 | 25 | 26 | 0 | 10795 | 51 |
| 170 | 10880 | 1 | 1 | 0 | 26 | 25 | 0 | 10880 | 51 |
| 171 | 10944 | 1 | 1 | 0 | 26 | 25 | 1 | 10965 | 52 |
| 172 | 11008 | 1 | 1 | 0 | 26 | 26 | 0 | 11050 | 52 |
| 173 | 11072 | 1 | 1 | 0 | 26 | 26 | 0 | 11050 | 52 |
| 174 | 11136 | 1 | 1 | 0 | 26 | 27 | 0 | 11220 | 53 |
| 175 | 11200 | 1 | 1 | 0 | 26 | 27 | 0 | 11220 | 53 |
| 176 | 11264 | 1 | 1 | 0 | 27 | 26 | 0 | 11305 | 53 |
| 177 | 11328 | 1 | 1 | 0 | 27 | 26 | 0 | 11305 | 53 |
| 178 | 11392 | 1 | 1 | 0 | 27 | 27 | 0 | 11475 | 54 |
| 179 | 11456 | 1 | 1 | 0 | 27 | 27 | 0 | 11475 | 54 |
| 180 | 11520 | 1 | 1 | 0 | 27 | 27 | 1 | 11560 | 55 |
| 181 | 11584 | 1 | 1 | 0 | 27 | 28 | 0 | 11645 | 55 |
| 182 | 11648 | 1 | 1 | 0 | 27 | 28 | 0 | 11645 | 55 |
| 183 | 11712 | 1 | 1 | 0 | 28 | 27 | 0 | 11730 | 55 |
| 184 | 11776 | 1 | 1 | 0 | 28 | 27 | 1 | 11815 | 56 |
| 185 | 11840 | 1 | 1 | 0 | 28 | 28 | 0 | 11900 | 56 |
| 186 | 11840 | 1 | 1 | 0 | 28 | 28 | 0 | 11900 | 56 |
| 187 | 11968 | 1 | 1 | 0 | 28 | 28 | 1 | 11985 | 57 |
| 188 | 12032 | 1 | 1 | 0 | 28 | 29 | 0 | 12070 | 57 |
| 189 | 12096 | 1 | 1 | 0 | 28 | 29 | 0 | 12070 | 57 |
| 190 | 12160 | 1 | 1 | 0 | 29 | 28 | 0 | 12155 | 57 |
| 191 | 12224 | 1 | 1 | 0 | 29 | 28 | 1 | 12240 | 58 |
| 192 | 12288 | 1 | 1 | 0 | 29 | 29 | 0 | 12325 | 58 |
| 193 | 12352 | 1 | 1 | 0 | 29 | 29 | 0 | 12325 | 58 |
| 194 | 12416 | 1 | 1 | 0 | 29 | 30 | 0 | 12495 | 59 |
| 195 | 12480 | 1 | 1 | 0 | 29 | 30 | 0 | 12495 | 59 |
| 196 | 12544 | 1 | 1 | 0 | 30 | 29 | 0 | 12580 | 59 |
| 197 | 12608 | 1 | 1 | 0 | 30 | 29 | 0 | 12580 | 59 |

※2 → (row 164)

| | | | | | | | | | 400b |
|---|---|---|---|---|---|---|---|---|---|
| 198 | 12672 | 1 | 1 | 0 | 30 | 30 | 0 | 12750 | 60 |
| 199 | 12736 | 1 | 1 | 0 | 30 | 30 | 0 | 12750 | 60 |
| 200 | 12800 | 1 | 1 | 0 | 30 | 30 | 1 | 12835 | 61 |
| 201 | 12864 | 1 | 1 | 0 | 30 | 31 | 0 | 12920 | 61 |
| 202 | 12928 | 1 | 1 | 0 | 30 | 31 | 0 | 12920 | 61 |
| 203 | 12992 | 1 | 1 | 0 | 31 | 30 | 0 | 13005 | 61 |
| 204 | 13056 | 1 | 1 | 0 | 31 | 30 | 1 | 13090 | 62 |
| 205 | 13120 | 1 | 1 | 0 | 31 | 31 | 0 | 13175 | 62 |
| 206 | 13184 | 1 | 1 | 0 | 31 | 31 | 0 | 13175 | 62 |
| 207 | 13248 | 1 | 1 | 0 | 31 | 31 | 1 | 13260 | 63 |
| 208 | 13312 | 1 | 1 | 0 | 31 | 32 | 0 | 13345 | 63 |
| 209 | 13376 | 2 | 1 | 0 | 39 | 20 | 0 | 13345 | 59 |
| 210 | 13440 | 2 | 1 | 0 | 40 | 19 | 0 | 13430 | 59 |
| 211 | 13504 | 2 | 1 | 0 | 40 | 19 | 1 | 13515 | 60 |
| 212 | 13568 | 2 | 1 | 0 | 40 | 20 | 0 | 13600 | 60 |
| 213 | 13632 | 2 | 1 | 0 | 40 | 20 | 0 | 13600 | 60 |
| 214 | 13696 | 2 | 1 | 0 | 40 | 21 | 0 | 13770 | 61 |
| 215 | 13760 | 2 | 1 | 0 | 40 | 21 | 0 | 13770 | 61 |
| 216 | 13824 | 2 | 1 | 0 | 41 | 20 | 0 | 13855 | 61 |
| 217 | 13888 | 2 | 1 | 0 | 41 | 20 | 0 | 13855 | 61 |
| 218 | 13952 | 2 | 1 | 0 | 41 | 21 | 0 | 14025 | 62 |
| 219 | 14016 | 2 | 1 | 0 | 41 | 21 | 0 | 14025 | 62 |
| 220 | 14080 | 2 | 1 | 0 | 41 | 21 | 1 | 14110 | 63 |
| 221 | 14144 | 2 | 1 | 0 | 42 | 20 | 0 | 14110 | 62 |
| 222 | 14208 | 2 | 1 | 0 | 42 | 21 | 0 | 14280 | 63 |
| 223 | 14272 | 2 | 1 | 0 | 42 | 21 | 0 | 14280 | 63 |
| 224 | 14336 | 2 | 1 | 0 | 42 | 21 | 1 | 14365 | 64 |
| 225 | 14400 | 2 | 1 | 0 | 42 | 22 | 0 | 14450 | 64 |
| 226 | 14464 | 2 | 1 | 0 | 43 | 21 | 0 | 14535 | 64 |
| 227 | 14528 | 2 | 1 | 0 | 43 | 21 | 0 | 14535 | 64 |
| 228 | 14592 | 3 | 1 | 0 | 49 | 12 | 1 | 14620 | 62 |
| 229 | 14656 | 3 | 1 | 0 | 49 | 13 | 0 | 14705 | 62 |
| 230 | 14720 | 3 | 1 | 0 | 49 | 13 | 0 | 14705 | 62 |
| 231 | 14784 | 3 | 1 | 0 | 50 | 12 | 0 | 14790 | 62 |
| 232 | 14848 | 3 | 1 | 0 | 50 | 12 | 1 | 14875 | 63 |
| 233 | 14912 | 3 | 1 | 0 | 50 | 13 | 0 | 14960 | 63 |
| 234 | 14976 | 3 | 1 | 0 | 50 | 13 | 0 | 14960 | 63 |
| 235 | 15040 | 3 | 1 | 0 | 51 | 12 | 0 | 15045 | 63 |
| 236 | 15104 | 3 | 1 | 0 | 51 | 12 | 1 | 15130 | 64 |
| 237 | 15168 | 3 | 1 | 0 | 51 | 13 | 0 | 15215 | 64 |
| 238 | 15232 | 3 | 1 | 0 | 51 | 13 | 0 | 15215 | 64 |

| | | | | | | | | | 400b |
|---|---|---|---|---|---|---|---|---|---|
| 239 | 15296 | 1 | 0 | 0 | 60 | 0 | 0 | 15300 | 60 |
| 240 | 15360 | 1 | 0 | 0 | 60 | 0 | 1 | 15385 | 61 |
| 241 | 15424 | 1 | 0 | 0 | 60 | 0 | 1 | 15385 | 61 |
| 242 | 15488 | 1 | 0 | 0 | 61 | 0 | 0 | 15470 | 61 |
| 243 | 15552 | 1 | 0 | 0 | 61 | 0 | 0 | 15555 | 61 |
| 244 | 15616 | 1 | 0 | 0 | 61 | 0 | 1 | 15640 | 62 |
| 245 | 15680 | 1 | 0 | 0 | 61 | 0 | 1 | 15640 | 62 |
| 246 | 15744 | 1 | 0 | 0 | 62 | 0 | 0 | 15810 | 62 |
| 247 | 15808 | 1 | 0 | 0 | 62 | 0 | 0 | 15810 | 62 |
| 248 | 15872 | 1 | 0 | 0 | 62 | 0 | 1 | 15895 | 63 |
| 249 | 15936 | 1 | 0 | 0 | 62 | 0 | 1 | 15895 | 63 |
| 250 | 16000 | 1 | 0 | 0 | 63 | 0 | 0 | 16065 | 63 |
| 251 | 16064 | 1 | 0 | 0 | 63 | 0 | 0 | 16065 | 63 |
| 252 | 16128 | 1 | 0 | 0 | 63 | 0 | 1 | 16150 | 64 |
| 253 | 16192 | 1 | 0 | 0 | 63 | 0 | 1 | 16150 | 64 |
| 254 | 16256 | 1 | 0 | 0 | 64 | 0 | 0 | 16320 | 64 |
| 255 | 16320 | 1 | 0 | 0 | 64 | 0 | 0 | 16320 | 64 |

| 50 | 51 | 52 | 53 | 54 | 55 | 56 | 57 |
|----|----|----|----|----|----|----|----|
| 49 | 26 | 27 | 29 | 29 | 30 | 31 | 58 |
| 48 | 25 | 10 | 11 | 12 | 13 | 32 | 59 |
| 47 | 24 | 9  | 2  | 3  | 14 | 33 | 60 |
| 46 | 23 | 8  | 1  | 4  | 15 | 34 | 61 |
| 45 | 22 | 7  | 6  | 5  | 16 | 35 | 62 |
| 44 | 21 | 20 | 19 | 18 | 17 | 36 | 63 |
| 43 | 42 | 41 | 40 | 39 | 38 | 37 | 64 |

FIG.17

| a[0,0] | a[1,0] | a[2,0] | a[3,0] | a[4,0] | a[5,0] | a[6,0] | a[7,0] |
|--------|--------|--------|--------|--------|--------|--------|--------|
| a[0,1] | a[1,1] | a[2,1] | a[3,1] | a[4,1] | a[5,1] | a[6,1] | a[7,1] |
| a[0,2] | a[1,2] | a[2,2] | a[3,2] | a[4,2] | a[5,2] | a[6,2] | a[7,2] |
| a[0,3] | a[1,3] | a[2,3] | a[3,3] | a[4,3] | a[5,3] | a[6,3] | a[7,3] |
| a[0,4] | a[1,4] | a[2,4] | a[3,4] | a[4,4] | a[5,4] | a[6,4] | a[7,4] |
| a[0,5] | a[1,5] | a[2,5] | a[3,5] | a[4,5] | a[5,5] | a[6,5] | a[7,5] |
| a[0,6] | a[1,6] | a[2,6] | a[3,6] | a[4,6] | a[5,6] | a[6,6] | a[7,6] |
| a[0,7] | a[1,7] | a[2,7] | a[3,7] | a[4,7] | a[5,7] | a[6,7] | a[7,7] |

FIG.18

|   | A | B | C | D |
|---|---|---|---|---|
| 1 |   | L | M | S |
| 2 |   | dL (=255) | dM (=170) | dS (=85) |
| 3 | TOTAL CONCEN-TRATION VALUE OF PIXEL AREA | rL | rM | rS |
| 4 | LU4 | RL4 | RM4 | RS4 |
| 5 | LU5 | RL5 | RM5 | RS5 |
| ... | ... | ... | ... | ... |

FIG.19

CONCENTRATION TOTAL VALUE
 6400(=CONCENTRATION AVERAGE VALUE 100)

RATIO L:M:S=0:2:1

NUMBER OF DOTS L:0 M:30 S:15

FIG.23

CONCENTRATION TOTAL VALUE
 14080(=CONCENTRATION AVERAGE VALUE 220)

RATIO L:M:S=2:1:0

NUMBER OF DOTS L:41 M:21 S:1

CONCENTRATION TOTAL VALUE
 15744(=CONCENTRATION AVERAGE VALUE 246)

RATIO L:M:S=1:0:0

NUMBER OF DOTS L:62 M:0 S:0

C(CYAN)

Y(YELLOW)

B(BLACK)

| CONCENTRATION VALUE OF EACH PIXEL (CONCENTRATION AVERAGE VALUE) | TOTAL CONCENTRATION VALUE OF PIXEL AREA | SET DOT RATIO | | | ACTUAL NUMBER OF DOTS | | | TOTAL OF ACTUAL NUMBERS OF DOTS (L+M+S) |
|---|---|---|---|---|---|---|---|---|
| | | L | M | S | L | M | S | |
| 0 | 0 | 0 | 0 | 0 | 0 | 0 | 0 | 0 |
| 30 | 480 | 0 | 0 | 1 | 0 | 0 | 6 | 6 |
| 70 | 1120 | 0 | 1 | 1 | 0 | 4 | 5 | 9 |
| 100 | 1600 | 0 | 2 | 1 | 0 | 8 | 3 | 11 |
| 125 | 2000 | 1 | 1 | 1 | 4 | 4 | 4 | 12 |
| 185 | 2960 | 1 | 1 | 0 | 7 | 7 | 0 | 14 |
| 220 | 3520 | 2 | 1 | 0 | 10 | 6 | 0 | 16 |
| 246 | 3936 | 1 | 0 | 0 | 15 | 0 | 1 | 16 |

FIG.32

| 4 | 8 | 20 | 11 | 1 |
|---|---|----|----|---|
| 10 | 14 | 24 | 15 | 5 |
| 17 | 21 | 25 | 23 | 19 |
| 6 | 16 | 22 | 13 | 9 |
| 2 | 12 | 18 | 7 | 3 |

FIG.33

| 4 | 8 | 20 | 11 | 1 | 4 | 8 | 20 | 11 | 1 |
|---|---|----|----|---|---|---|----|----|---|
| 10 | 14 | 24 | 15 | 5 | 10 | 14 | 24 | 15 | 5 |
| 17 | 21 | 25 | 23 | 19 | 17 | 21 | 25 | 23 | 19 |
| 6 | 16 | 22 | 13 | 9 | 6 | 16 | 22 | 13 | 9 |
| 2 | 12 | 18 | 7 | 3 | 2 | 12 | 18 | 7 | 3 |
| 4 | 8 | 20 | 11 | 1 | 4 | 8 | 20 | 11 | 1 |
| 10 | 14 | 24 | 15 | 5 | 10 | 14 | 24 | 15 | 5 |
| 17 | 21 | 25 | 23 | 19 | 17 | 21 | 25 | 23 | 19 |
| 6 | 16 | 22 | 13 | 9 | 6 | 16 | 22 | 13 | 9 |
| 2 | 12 | 18 | 7 | 3 | 2 | 12 | 18 | 7 | 3 |

FIG.34

LINE HEAD TYPE

MULTI-PASS TYPE

PRINTING APPARATUS, PRINTING PROGRAM, PRINTING METHOD, IMAGE PROCESSING APPARATUS, IMAGE PROCESSING PROGRAM, IMAGE PROCESSING METHOD, AND RECORDING MEDIUM HAVING THE PROGRAM RECORDED THEREIN

RELATED APPLICATIONS

This application claims priority to Japanese Patent Application Nos. 2005-085692 filed Mar. 24, 2005 and 2005-374469 filed Dec. 27, 2005 which are hereby expressly incorporated by reference herein in their entirety.

BACKGROUND

1. Technical Field

The present invention relates to printing apparatuses such as a facsimile apparatus, a copying machine, and a printer for OA equipment, and, more particularly to a printing apparatus, a printing program, a printing method, an image processing apparatus, an image processing program, an image processing method, and a recording medium having the program recorded therein that are suitable for performing print processing of a so-called ink jet system adapted to eject particles of liquid inks of plural colors onto a printing sheet (a recording material) to draw predetermined characters and images thereon.

2. Related Art

A printing apparatus, in particular, a printer adopting the ink jet system (hereinafter referred to as "ink jet printer") will be hereinafter explained.

In general, it is possible to easily obtain inexpensive and high quality color prints with an ink jet printer. Thus, ink jet printers are widely used not only in offices but also at homes of general users in accordance with the spread of personal computers and digital cameras.

In such an ink jet printer, in general, a movable body called a carriage or the like integrally provided with an ink cartridge and a print head ejects (jets) particles of liquid inks in a dot shape from nozzles of the print head while reciprocating on a print medium (a sheet) in a direction orthogonal to a sheet feeding direction of the print medium. In this way, the ink jet printer draws predetermined characters and images on the print medium to create a desired print. The carriage includes ink cartridges of four colors (yellow, magenta, cyan, and black) and print heads for the respective colors. Thus, the ink jet printer can easily perform not only monochrome printing but also full-color printing in which the respective colors are combined (moreover, full-color printing of six, seven, or eight colors including light cyan, light magenta, and the like in addition to the four colors is also put to practical use).

In the ink jet printer of the type adapted to execute printing while causing the print head to reciprocate on the carriage in the direction orthogonal to the sheet feeding direction in this way, it is necessary to cause the print head to reciprocate several tens of times to one hundred times or more in order to clearly print characters and images on one entire page. Thus, the ink jet printer has a disadvantage in that a substantially long printing time is required compared with printing apparatuses of other systems, for example, a laser printer and the like that use an electrophotographic technology used in a copy machine and the like.

On the other hand, in an ink jet printer of a type in which a long print head having a dimension (width) the same as (or longer than) a width of a printing sheet is arranged and a carriage is not used, it is unnecessary to move the print head in a width direction of the printing sheet. Thus, printing in a so-called one scanning (one path) is possible. This makes it possible to perform high speed printing in the same manner as the laser printer. Further, since the carriage mounted with the print head and a driving system and the like for moving the carriage are unnecessary, this ink jet printer also has an advantage in that it is possible to reduce the size and weight of a printer housing and noise reduction is significantly improved. The ink jet printer of the former type is generally called a "multi-path printer" and the ink jet printer of the latter system is generally called a "line head printer".

In the print head that is indispensable to such ink jet printers, fine nozzles having a diameter of about 10 μm to 70 μm are disposed in one row at fixed intervals or plural rows in a printing direction. Thus, for example, ink ejecting directions of a part of the nozzles may be slanted because of a manufacturing error or the nozzles may be arranged in positions deviating from ideal positions. As a result, arriving positions of dots formed on a print medium by the nozzles may deviate from ideal positions. In other words, a so-called "flight deviation phenomenon" may occur. Further, because of a dispersion characteristic of the nozzles, in nozzles having a large dispersion, an amount of ink may be extremely large or small compared with an ideal amount.

As a result, a printing failure called a "banding (streak) phenomenon" may occur in a portion of an image printed using the defective nozzles to significantly deteriorate print quality. When the "flight deviation phenomenon" occurs, distances among dots ejected by adjacent nozzles become non-uniform. A "white streak" (when a printing sheet is white) is caused in a portion where the distances among the adjacent dots are longer than a normal distance. A "thick streak" or "dark streak" is caused in a portion where the distances among the adjacent dots are shorter than the normal distance. When a value of an amount of ink deviates from an ideal value, the thick streak is caused in a portion of the nozzles where the amount of ink is large and the white streak is caused in a portion where the ink amount is small.

In particular, such a banding phenomenon tends to occur markedly in the "line head printer" in which the print head or the print medium is fixed (one path printing) rather than the "multi-path printer" (a serial printer) described above (in the multi-path printer, there is a technique for making banding less conspicuous by making use of the fact that the print head can be caused to reciprocate many times).

Therefore, in order to prevent a kind of printing failure due to such a "banding phenomenon", hardware research and development such as improvement of a technique for manufacturing print heads and design improvement are earnestly carried out. However, because of manufacturing costs, technical issues, and the like, it is difficult to provide a print head that does not cause any "banding phenomenon".

Under the present situation, in addition to the improvement in hardware, a technique for reducing such a "banding phenomenon" using a so-called software method such as printing control described below can be adopted.

For example, in JP-A-2001-177722, in quantizing a multi-gradation image, after error diffusion processing is carried out, dither processing is performed to cause dots to concentrate in low and medium concentration parts of the multi-gradation image and cause dots to disperse around the concentrating dots in a high concentration part. Consequently, an image without a white void in, in particular, the high concentration part is formed.

However, in the related art described above, although it is possible to reduce the banding phenomenon in the high concentration part, in general, it is difficult to reduce the banding phenomenon in the medium concentration part and the low concentration part where the banding phenomenon is conspicuous. Since the concentration of dots is conspicuous in the medium concentration part and the low concentration part, it is likely that granularity is conspicuous to deteriorate image quality.

In the dither processing, in general, a concentration value of an input image is set on and off with a threshold value of a dither matrix as a boundary. Thus, an input concentration value and an output concentration value may not coincide with each other. Therefore, the dither processing has a characteristic that, in particular, gradation reproducibility is low.

SUMMARY

An advantage of some aspects of the invention is to provide a printing apparatus, a printing program, a printing method, an image processing apparatus, an image processing program, an image processing method, and a recording medium having the program recorded therein that can eliminate the banding phenomenon due to the flight deviation phenomenon or make the banding phenomenon practically inconspicuous.

Another advantage of some aspects of the invention is to provide a printing apparatus, a printing program, a printing method, an image processing apparatus, an image processing program, an image processing method, and a recording medium having the program recorded therein with which it is possible to obtain a print excellent in gradation reproducibility in, in particular, a gradation image.

According to a first aspect of the invention, there is provided a printing apparatus including an image data acquiring unit, an image data dividing unit, a total of pixel-area-concentration-values calculating unit, a pixel area dot constitution table storing unit, a dot constitution calculating unit, a dot arrangement order table storing unit, a dot arranging unit, a print data generating unit, and a printing unit. The image data acquiring unit acquires M-ary (M≧3) image data. The image data dividing unit divides the image data acquired by the image data acquiring unit into plural pixel areas. The total of pixel-area-concentration-values calculating unit calculates a total of concentration values of respective pixels in the plural pixel areas divided by the image data dividing unit. The pixel area dot constitution table storing unit has stored therein a pixel area dot constitution table that designates the total concentration value of each of the pixel areas calculated by the total of pixel-area-concentration-values calculating unit and a dot constitution corresponding to the total concentration value of the pixel area. The dot constitution calculating unit calculates a constitution of dots arranged in the pixel area on the basis of the pixel area dot constitution table. The dot arrangement order table storing unit has stored therein a dot arrangement order table that designates an arrangement order of the dots arranged in the pixel area. The dot arranging unit arranges the dots having the dot constitution calculated by the dot constitution calculating unit in the pixel area in accordance with the arrangement order of the dots designated in the dot arrangement order table of the dot arrangement order table storing unit. The print data generating unit generates print data by combining the respective pixel areas in which the dots are arranged by the dot arranging unit. The printing unit executes printing on the basis of the print data generated by the print data generating unit.

In the aspect of the invention, multi-gradation image data is divided into pixel areas, a concentration total value of each of the pixel areas is calculated, and a dot constitution in the pixel area is calculated from the concentration total value to perform dot arrangement. Consequently, in particular, it is possible to eliminate the banding phenomenon such as a white streak or a thick streak due to the flight deviation phenomenon or make the banding phenomenon practically inconspicuous.

It is possible to freely set (reduce) a pixel area size according to division processing. This makes it possible to obtain a high-quality print.

Moreover, an input concentration value and an output concentration value easily coincide with each other. This makes it possible to display excellent gradation reproducibility in, in particular, a gradation image.

It is assumed that the "M-ary (M≧3)" refers to a multi-valued pixel value concerning a so-called luminance and concentration that is represented as, for example, 8 bits and 256 gradations (the same holds true in descriptions of a form concerning a "printing apparatus", a form concerning a "printing program", a form concerning a "printing method", a form concerning an "image processing apparatus", a form concerning an "image processing program", a form concerning an "image processing method", a form concerning a "recording medium having the program recorded therein", and a section of embodiments, and the like).

It is preferable that the dot constitution calculating unit calculates an actual number of dots for each dot size classified according to diameters of the dots.

Consequently, it is possible to calculate a dot constitution in the pixel area by defining the dot constitution as, for example, a large (L) size, a medium (M) size, and a small (S) size for each of the sizes of dot diameters. This makes it possible to perform accurate processing.

It is preferable that, in the dot arrangement order table stored in the dot arrangement order table storing unit, the dot arrangement order is designated such that the dots are preferentially arranged in order from a dot having a largest dot diameter in the pixel area.

Consequently, the dots are preferentially arranged in order from a dot having a largest dot diameter in the pixel area and concentrate. This makes it possible to make the banding phenomenon less conspicuous.

It is preferable that, in the dot arrangement order table stored in the dot arrangement order table storing unit, the dot arrangement order is designated such that the dots are arranged substantially in an elliptical shape in the pixel area.

Consequently, the dots concentrate substantially in an elliptical shape in the pixel area. This makes it possible to further make the banding phenomenon less conspicuous.

It is preferable that, in the dot arrangement order table stored in the dot arrangement order table storing unit, the dot arrangement order is designated such that the dots are arranged from a pixel closest to a center of gravity of the pixel area toward the periphery of the pixel area.

Consequently, since the dots are sequentially arranged from the pixel closest to the center of gravity of the pixel area toward the periphery of the pixel area, the dots concentrate in the part of the center of gravity. This makes it possible to further make the banding phenomenon less conspicuous.

The "center of gravity" in the description "from the pixel closest to the center of gravity of the pixel area toward the periphery of the pixel area" means the "center" of the pixel area. This description means that the dots are arranged to be arranged to be concentrated from the center toward the periphery.

It is preferable that, in the dot arrangement order table stored in the dot arrangement order table storing unit, the dot arrangement order is designated such that the dots are arranged over the plural pixel areas and arranged from a predetermined position in the plural pixel areas toward the periphery of the predetermined position.

Consequently, since the dot arrangement order is designated such that the dots are arranged over the plural pixel areas and arranged from the predetermined position in the plural pixel areas toward the periphery of the predetermined position, the dots concentrate not only from the center or the center of gravity portion toward the periphery but also from an arbitrary position. Thus, it is possible to select and use an optimum dot arrangement order table according to, for example, a target image quality and a magnitude of the banding phenomenon or the like. This makes it possible to carry out accurate processing.

It is preferable that the dot arrangement order table storing unit includes two or more kinds of dot arrangement order tables in which dot arrangement orders are different from one another. It is preferable that the dot arranging unit selects one dot arrangement order table out of the dot arrangement order tables stored in the dot arrangement order table storing unit and uses the dot arrangement order table.

Consequently, it is possible to select and use an optimum dot arrangement order table according to, for example, a target image quality and a magnitude of the banding phenomenon or the like. This makes it possible to carry out accurate processing.

Concerning the description "selects one dot arrangement order table out of the dot arrangement order tables stored in the dot arrangement order table storing unit and uses the dot arrangement order table", a method of avoiding banding by deforming a shape of "concentrating dots" to worsen granularity is conceivable. Specifically, it is also conceivable to determine, according to dot arriving position accuracy and print resolution, which dot arrangement order table should be used.

It is preferable that the pixel area dot constitution table in the pixel area dot constitution table storing unit designates a constitution ratio for each dot size corresponding to the total concentration value.

Consequently, for example, when the banding phenomenon is conspicuous, a large dot is preferentially selected to reduce the banding phenomenon. When the banding phenomenon is not so conspicuous, a small dot is preferentially selected. This makes it possible to realize improvement of image quality.

It is possible to set the constitution ratio for each dot size corresponding to the total concentration value variable.

It is preferable that, as the constitution ratio for each dot size of the pixel area dot constitution table in the pixel area dot constitution table storing unit, when the total concentration value of the pixel area calculated by the total of pixel-area-concentration-values calculating unit is equal to or lower than a predetermined concentration value, a total number of dots having sizes equal to or smaller than a predetermined size is set larger than a total number of dots having sizes equal to or larger than the predetermined size.

Consequently, when the total concentration value of the pixel area is equal to or lower than the predetermined concentration, the total number of the dots having sizes equal to or smaller than the predetermined size is set larger than the total number of the dots having sizes equal to or larger than the predetermined size. Thus, since concentrating dots are formed mainly from the dots having sizes equal to or smaller than the predetermined size when the total concentration value is low, it is possible to keep down granularity that causes deterioration in image quality. This makes it possible to attain improvement of image quality in the low concentration part. If the concentrating dots are formed mainly from the dots having sizes equal to or larger than the predetermined size instead of the dots having sizes equal to or smaller than the predetermined size, granularity is worsened and the overall image quality is deteriorated.

It is preferable that the dot arranging unit arranges, in arranging the dots in accordance with the dot arrangement order table, the dots after irregularly rotating arrangement positions thereof at a predetermined angle around the center of the pixel area.

Consequently, it is possible to exclude periodicity that causes deterioration in image quality. This makes it possible to attain improvement of image quality in, in particular, identical concentration parts.

It is preferable that the print data generating unit generates, when the M-ary ($M \geq 3$) image data acquired by the image data acquiring unit is image data formed of plural colors, print data by combining pixel areas for the respective colors after setting predetermined screen angles in the pixel areas for the respective colors.

Consequently, since the screen angles are set for the respective colors, for example, when a color image is printed, it is possible to prevent occurrence of a moiré phenomenon (interference fringe) among dots having different colors.

It is preferable that the printing apparatus is an ink jet printer that performs printing when a movable body called a carriage integrally provided with an ink cartridge and a print head ejects particles of liquid inks in a dot shape from nozzles of the print head while reciprocating on a print medium in a horizontal direction orthogonal to a sheet feeding direction of the print medium.

Consequently, since the particles of the liquid inks are ejected in the dot shape using the ink jet printer, it is possible to reduce the banding phenomenon.

According to a second aspect of the invention, there is provided a printing program that causes a computer to function as an image data acquiring unit, an image data dividing unit, a total of pixel-area-concentration-values calculating unit, a pixel area dot constitution table storing unit, a dot constitution calculating unit, a dot arrangement order table storing unit, a dot arranging unit, a print data generating unit, and a printing unit. The image data acquiring unit acquires M-ary ($M \geq 3$) image data. The image data dividing unit divides the image data acquired by the image data acquiring unit into plural pixel areas. The total of pixel-area-concentration-values calculating unit calculates a total of concentration values of respective pixels in the plural pixel areas divided by the image data dividing unit. The pixel area dot constitution table storing unit has stored therein a pixel area dot constitution table that designates the total concentration value of each of the pixel areas calculated by the total of pixel-area-concentration-values calculating unit and a dot constitution corresponding to the total concentration value of the pixel area. The dot constitution calculating unit calculates a constitution of dots arranged in the pixel area on the basis of the pixel area dot constitution table. The dot arrangement order table storing unit has stored therein a dot arrangement order table that designates an arrangement order of the dots arranged in the pixel area. The dot arranging unit arranges the dots having the dot constitution calculated by the dot constitution calculating unit in the pixel area in accordance with the arrangement order of the dots designated in the dot arrangement order table of the dot arrangement order table storing unit. The print data generating unit generates print data by combining the respective pixel areas in which the dots are arranged by the dot arranging unit. The printing unit executes printing on the basis of the print data generated by the print data generating unit.

Consequently, as in the printing apparatus according to the first aspect of the invention, it is possible to eliminate the banding phenomenon such as a white streak or a thick streak due to the flight deviation phenomenon or make the banding phenomenon practically inconspicuous. It is possible to freely set (reduce) a pixel area size according to division processing. This makes it possible to obtain a high-quality print. Moreover, an input concentration value and an output concentration value easily coincide with each other. This makes it possible to display excellent gradation reproducibility in, in particular, a gradation image.

Almost all printing apparatuses such as an ink jet printer currently placed on the market include a computer system including a central processing unit (CPU), storage devices (a RAM and a ROM), and input-output devices. It is possible to realize the respective units described above with software using the computer system. This makes it possible to economically and easily realize the respective units compared with the case in which dedicated hardware is created to realize the respective units. Moreover, it is possible to easily perform upgrade of the printing program through modification, improvement, and the like of functions by rewriting a part of the program.

It is preferable that the dot constitution-calculating unit calculates an actual number of dots for each dot size classified according to diameters of the dots.

Consequently, as in the printing apparatus according to the first aspect of the invention, it is possible to calculate a dot constitution in the pixel area by defining the dot constitution as, for example, a large (L) size, a medium (M) size, and a small (S) size for each of the sizes of dot diameters. This makes it possible to perform accurate processing.

As described above, it is possible to realize the respective units with software using the computer system included in almost all the printing apparatuses currently placed on the market. This makes it possible to economically and easily realize the respective units compared with the case in which dedicated hardware is created to realize the respective units. Moreover, it is possible to easily perform upgrade of the printing program through modification, improvement, and the like of functions by rewriting a part of the program.

It is preferable that, in the dot arrangement order table stored in the dot arrangement order table storing unit, the dot arrangement order is designated such that the dots are preferentially arranged in order from a dot having a largest dot diameter in the pixel area.

Consequently, as in the printing apparatus according to the first aspect of the invention, the dots are preferentially arranged in order from a dot having a largest dot diameter in the pixel area and concentrate. This makes it possible to make the banding phenomenon less conspicuous.

As described above, it is possible to realize the respective units with software using the computer system included in almost all the printing apparatuses currently placed on the market. This makes it possible to economically and easily realize the respective units compared with the case in which dedicated hardware is created to realize the respective units. Moreover, it is possible to easily perform upgrade of the printing program through modification, improvement, and the like of functions by rewriting a part of the program.

It is preferable that, in the dot arrangement order table stored in the dot arrangement order table storing unit, the dot arrangement order is designated such that the dots are arranged substantially in an elliptical shape in the pixel area.

Consequently, as in the printing apparatus according to the first aspect of the invention, the dots concentrate substantially in an elliptical shape in the pixel area. This makes it possible to further make the banding phenomenon less conspicuous.

As described above, it is possible to realize the respective units with software using the computer system included in almost all the printing apparatuses currently placed on the market. This makes it possible to economically and easily realize the respective units compared with the case in which dedicated hardware is created to realize the respective units. Moreover, it is possible to easily perform upgrade of the printing program through modification, improvement, and the like of functions by rewriting a part of the program.

It is preferable that, in the dot arrangement order table storing unit, the dot arrangement order is designated such that the dots are arranged from a pixel closest to a center of gravity of the pixel area toward the periphery of the pixel area.

Consequently, as in the printing apparatus according to the first aspect of the invention, since the dots are sequentially arranged from the pixel closest to the center of gravity of the pixel area toward the periphery of the pixel area, the dots concentrate in the part of the center of gravity. This makes it possible to further make the banding phenomenon less conspicuous.

The "center of gravity" in the description "from the pixel closest to the center of gravity of the pixel area toward the periphery of the pixel area" means the "center" of the pixel area. This description means that the dots are arranged to be arranged to be concentrated from the center toward the periphery.

As described above, it is possible to realize the respective units with software using the computer system included in almost all the printing apparatuses currently placed on the market. This makes it possible to economically and easily realize the respective units compared with the case in which dedicated hardware is created to realize the respective units. Moreover, it is possible to easily perform upgrade of the printing program through modification, improvement, and the like of functions by rewriting a part of the program.

It is preferable that, in the dot arrangement order table stored in the dot arrangement order table storing unit, the dot arrangement order is designated such that the dots are arranged over the plural pixel areas and arranged from a predetermined position in the plural pixel areas toward the periphery of the predetermined position.

Consequently, as in the printing apparatus according to the first aspect of the invention, since the dot arrangement order is designated such that the dots are arranged over the plural pixel areas and arranged from the predetermined position in the plural pixel areas toward the periphery of the predetermined position, the dots concentrate not only from the center or the center of gravity portion toward the periphery but also from an arbitrary position. Thus, it is possible to select and use an optimum dot arrangement order table according to, for example, a target image quality and a magnitude of the banding phenomenon or the like. This makes it possible to carry out accurate processing.

As described above, it is possible to realize the respective units with software using the computer system included in almost all the printing apparatuses currently placed on the market. This makes it possible to economically and easily realize the respective units compared with the case in which dedicated hardware is created to realize the respective units. Moreover, it is possible to easily perform upgrade of the printing program through modification, improvement, and the like of functions by rewriting a part of the program.

It is preferable that the dot arrangement order table storing unit includes two or more kinds of dot arrangement order tables in which dot arrangement orders are different from one another. It is preferable that the dot arranging unit selects one dot arrangement order table out of the dot arrangement order tables stored in the dot arrangement order table storing unit and uses the dot arrangement order table.

Consequently, as in the printing apparatus according to the first aspect of the invention, it is possible to select and use an optimum dot arrangement order table according to, for example, a target image quality and a magnitude of the banding phenomenon or the like. This makes it possible to carry out accurate processing.

Concerning the description "selects one dot arrangement order table out of the dot arrangement order tables stored in the dot arrangement order table storing unit and uses the dot arrangement order table", a method of avoiding banding by deforming a shape of "concentrating dots" to worsen granularity is conceivable. Specifically, it is also conceivable to determine, according to dot arriving position accuracy and print resolution, which dot arrangement order table should be used.

As described above, it is possible to realize the respective units with software using the computer system included in almost all the printing apparatuses currently placed on the market. This makes it possible to economically and easily realize the respective units compared with the case in which dedicated hardware is created to realize the respective units. Moreover, it is possible to easily perform upgrade of the printing program through modification, improvement, and the like of functions by rewriting a part of the program.

It is preferable that the pixel area dot constitution table in the pixel area dot constitution table storing unit designates a constitution ratio for each dot size corresponding to the total concentration value.

Consequently, as in the printing apparatus according to the first aspect of the invention, for example, when the banding phenomenon is conspicuous, a large dot is preferentially selected to reduce the banding phenomenon. When the banding phenomenon is not so conspicuous, a small dot is preferentially selected. This makes it possible to realize improvement of image quality.

It is possible to set the constitution ratio for each dot size corresponding to the total concentration value variable.

As described above, it is possible to realize the respective units with software using the computer system included in almost all the printing apparatuses currently placed on the market. This makes it possible to economically and easily realize the respective units compared with the case in which dedicated hardware is created to realize the respective units. Moreover, it is possible to easily perform upgrade of the printing program through modification, improvement, and the like of functions by rewriting a part of the program.

It is preferable that, as the constitution ratio for each dot size of the pixel area dot constitution table in the pixel area dot constitution table storing unit, when the total concentration value of the pixel area calculated by the total of pixel-area-concentration-values calculating unit is equal to or lower than a predetermined concentration value, a total number of dots having sizes equal to or smaller than a predetermined size is set larger than a total number of dots having sizes equal to or larger than the predetermined size.

Consequently, as in the printing apparatus according to the first aspect of the invention, when the total concentration value of the pixel area is equal to or lower than the predetermined concentration, the total number of the dots having sizes equal to or smaller than the predetermined size is set larger than the total number of the dots having sizes equal to or larger than the predetermined size. Thus, since concentrating dots are formed mainly from the dots having sizes equal to or smaller than the predetermined size when the total concentration value is low, it is possible to keep down granularity that causes deterioration in image quality. This makes it possible to attain improvement of image quality in the low concentration part. If the concentrating dots are formed mainly from the dots having sizes equal to or larger than the predetermined size instead of the dots having sizes equal to or smaller than the predetermined size, granularity is worsened and the overall image quality is deteriorated.

As described above, it is possible to realize the respective units with software using the computer system included in almost all the printing apparatuses currently placed on the market. This makes it possible to economically and easily realize the respective units compared with the case in which dedicated hardware is created to realize the respective units. Moreover, it is possible to easily perform upgrade of the printing program through modification, improvement, and the like of functions by rewriting a part of the program.

It is preferable that the dot arranging unit arranges, in arranging the dots in accordance with the dot arrangement order table, the dots after irregularly rotating arrangement positions thereof at a predetermined angle around the center of the pixel area.

Consequently, as in the printing apparatus according to the first aspect of the invention, it is possible to exclude periodicity that causes deterioration in image quality. This makes it possible to attain improvement of image quality in, in particular, identical concentration parts.

As described above, it is possible to realize the respective units with software using the computer system included in almost all the printing apparatuses currently placed on the market. This makes it possible to economically and easily realize the respective units compared with the case in which dedicated hardware is created to realize the respective units. Moreover, it is possible to easily perform upgrade of the printing program through modification, improvement, and the like of functions by rewriting a part of the program.

It is preferable that the print data generating unit generates, when the M-ary (M≧3) image data acquired by the image data acquiring unit is image data formed of plural colors, print data by combining pixel areas for the respective colors after setting predetermined screen angles in the pixel areas for the respective colors.

Consequently, as in the printing apparatus according to the first aspect of the invention, since the screen angles are set for the respective colors, for example, when a color image is printed, it is possible to prevent occurrence of a moiré phenomenon (interference fringe) among dots having different colors.

As described above, it is possible to realize the respective units with software using the computer system included in almost all the printing apparatuses currently placed on the market. This makes it possible to economically and easily realize the respective units compared with the case in which dedicated hardware is created to realize the respective units. Moreover, it is possible to easily perform upgrade of the printing program through modification, improvement, and the like of functions by rewriting a part of the program.

It is preferable that the printing program causes the computer to function as an ink jet printer that performs printing when a movable body called a carriage integrally provided with an ink cartridge and a print head ejects particles of liquid inks in a dot shape from nozzles of the print head while reciprocating on a print medium in a horizontal direction orthogonal to a sheet feeding direction of the print medium.

Consequently, as in the printing apparatus according to the first aspect of the invention, since the particles of the liquid inks are ejected in the dot shape using the ink jet printer, it is possible to reduce the banding phenomenon.

As described above, it is possible to realize the respective units with software using the computer system included in almost all the printing apparatuses currently placed on the market. This makes it possible to economically and easily realize the respective units compared with the case in which dedicated hardware is created to realize the respective units. Moreover, it is possible to easily perform upgrade of the printing program through modification, improvement, and the like of functions by rewriting a part of the program.

According to a third aspect of the invention, there is provided a computer readable recording medium having recorded therein the printing program described above.

Consequently, it is possible to easily and surely provide consumers such as users with the printing program described above via computer readable recording media such as a CD-ROM, a DVD-ROM, an FD, and a semiconductor chip.

According to a fourth aspect of the invention, there is provided a printing method including an image data acquiring step, an image data dividing step, a total of pixel-area-concentration-values calculating step, a pixel area dot constitution table storing step, a dot constitution calculating step, a dot arrangement order table storing step, a dot arranging step, a print data generating step, and a printing step. In the image data acquiring step, M-ary (M≧3) image data is acquired. In the image data dividing step, the image data acquired in the image data acquiring step is divided into plural pixel areas. In the total of pixel-area-concentration-values calculating step, a total of concentration values of respective pixels in the plural pixel areas divided in the image data dividing step is calculated. In the pixel area dot constitution table storing step, a pixel area dot constitution table that designates the total concentration value of each of the pixel areas calculated in the total of pixel-area-concentration-values calculating step and a dot constitution corresponding to the total concentration value of the pixel area is stored. In the dot constitution calculating step, a constitution of dots arranged in the pixel area is calculated on the basis of the pixel area dot constitution table. In the dot arrangement order table storing step, dot arrangement order table that designates an arrangement order of the dots arranged in the pixel area is stored. In the dot arranging step, the dots having the dot constitution calculated in the dot constitution calculating step in accordance with the arrangement order of the dots designated in the dot arrangement order table stored in the dot arrangement order table storing step are arranged in the pixel area. In the print data generating step, print data is generated by combining the respective pixel areas in which the dots are arranged in the dot arranging step. In the printing step, printing is executed on the basis of the print data generated in the print data generating step.

Consequently, as in the printing apparatus according to the first aspect of the invention, it is possible to eliminate the banding phenomenon such as a white streak or a thick streak due to the flight deviation phenomenon or make the banding phenomenon practically inconspicuous. It is possible to freely set (reduce) a pixel area size according to division processing. This makes it possible to obtain a high-quality print. Moreover, an input concentration value and an output concentration value easily coincide with each other. This makes it possible to display excellent gradation reproducibility in, in particular, a gradation image.

It is preferable that, in the dot constitution calculating step, an actual number of dots for each dot size classified according to diameters of the dots is calculated.

Consequently, as in the printing apparatus according to the first aspect of the invention, it is possible to calculate a dot constitution in the pixel area by defining the dot constitution as, for example, a large (L) size, a medium (M) size, and a small (S) size for each of the sizes of dot diameters. This makes it possible to perform accurate processing.

It is preferable that, in the dot arrangement order table stored in the dot arrangement order table storing step, the dot arrangement order is designated such that the dots are preferentially arranged in order from a dot having a largest dot diameter in the pixel area.

Consequently, as in the printing apparatus according to the first aspect of the invention, the dots are preferentially arranged in order from a dot having a largest dot diameter in the pixel area and concentrate. This makes it possible to make the banding phenomenon less conspicuous.

It is preferable that, in the dot arrangement order table stored in the dot arrangement order table storing step, the dot arrangement order is designated such that the dots are arranged substantially in an elliptical shape in the pixel area.

Consequently, as in the printing apparatus according to the first aspect of the invention, the dots concentrate substantially in an elliptical shape in the pixel area. This makes it possible to further make the banding phenomenon less conspicuous.

It is preferable that, in the dot arrangement order table storing step, the dot arrangement order is designated such that the dots are arranged from a pixel closest to a center of gravity of the pixel area toward the periphery of the pixel area.

Consequently, as in the printing apparatus according to the first aspect of the invention, since the dots are sequentially arranged from the pixel closest to the center of gravity of the pixel area toward the periphery of the pixel area, the dots concentrate in the part of the center of gravity. This makes it possible to further make the banding phenomenon less conspicuous.

The "center of gravity" in the description "from the pixel closest to the center of gravity of the pixel area toward the periphery of the pixel area" means the "center" of the pixel area. This description means that the dots are arranged to be concentrated from the center toward the periphery.

It is preferable that, in the dot arrangement order table stored in the dot arrangement order table storing step, the dot arrangement order is designated such that the dots are arranged over the plural pixel areas and arranged from a predetermined position in the plural pixel areas toward the periphery of the predetermined position.

Consequently, as in the printing apparatus according to the first aspect of the invention, since the dot arrangement order is designated such that the dots are arranged over the plural pixel areas and arranged from the predetermined position in the plural pixel areas toward the periphery of the predetermined position, the dots concentrate not only from the center or the center of gravity portion toward the periphery but also from an arbitrary position. Thus, it is possible to select and use an optimum dot arrangement order table according to, for example, a target image quality and a magnitude of the banding phenomenon or the like. This makes it possible to carry out accurate processing.

It is preferable that, in the dot arrangement order table storing step, two or more kinds of dot arrangement order tables in which dot arrangement orders are different from one another are provided. It is preferable that, in the dot arranging step, one dot arrangement order table out of the dot arrangement order tables stored in the dot arrangement order table storing step is selected and used.

Consequently, as in the printing apparatus according to the first aspect of the invention, it is possible to select and use an optimum dot arrangement order table according to, for example, a target image quality and a magnitude of the banding phenomenon or the like. This makes it possible to carry out accurate processing.

Concerning the description "selects one dot arrangement order table out of the dot arrangement order tables stored in the dot arrangement order table storing unit and uses the dot arrangement order table", a method of avoiding banding by deforming a shape of "concentrating dots" to worsen granularity is conceivable. Specifically, it is also conceivable to determine, according to dot arriving position accuracy and print resolution, which dot arrangement order table should be used.

It is preferable that the pixel area dot constitution table stored in the pixel area dot constitution table storing step designates a constitution ratio for each dot size corresponding to the total concentration value.

Consequently, as in the printing apparatus according to the first aspect of the invention, for example, when the banding phenomenon is conspicuous, a large dot is preferentially selected to reduce the banding phenomenon. When the banding phenomenon is not so conspicuous, a small dot is preferentially selected. This makes it possible to realize improvement of image quality.

It is possible to set the constitution ratio for each dot size corresponding to the total concentration value variable.

It is preferable that, as the constitution ratio for each dot size of the pixel area dot constitution table stored in the pixel area dot constitution table storing step, when the total concentration value of the pixel area calculated in the total of pixel-area-concentration-values calculating step is equal to or lower than a predetermined concentration value, a total number of dots having sizes equal to or smaller than a predetermined size is set larger than a total number of dots having sizes equal to or larger than the predetermined size.

Consequently, as in the printing apparatus according to the first aspect of the invention, when the total concentration value of the pixel area is equal to or lower than the predetermined concentration, the total number of the dots having sizes equal to or smaller than the predetermined size is set larger than the total number of the dots having sizes equal to or larger than the predetermined size. Thus, since concentrating dots are formed mainly from the dots having sizes equal to or smaller than the predetermined size when the total concentration value is low, it is possible to keep down granularity that causes deterioration in image quality. This makes it possible to attain improvement of image quality in the low concentration part. If the concentrating dots are formed mainly from the dots having sizes equal to or larger than the predetermined size instead of the dots having sizes equal to or smaller than the predetermined size, granularity is worsened and the overall image quality is deteriorated.

It is preferable that, in the dot arranging step, in arranging the dots in accordance with the dot arrangement order table, the dots are arranged after arrangement positions thereof are irregularly rotated at a predetermined angle around the center of the pixel area.

Consequently, as in the printing apparatus according to the first aspect of the invention, it is possible to exclude periodicity that causes deterioration in image quality. This makes it possible to attain improvement of image quality in, in particular, identical concentration parts.

It is preferable that, in the print data generating step, when the M-ary (M≧3) image data acquired in the image data acquiring step is image data formed of plural colors, print data is generated by combining pixel areas for the respective colors after setting predetermined screen angles in the pixel areas for the respective colors.

Consequently, as in the printing apparatus according to the first aspect of the invention, since the screen angles are set for the respective colors, for example, when a color image is printed, it is possible to prevent occurrence of a moiré phenomenon (interference fringe) among dots having different colors.

It is preferable that the printing method is a printing method for an ink jet printer that performs printing when a movable body called a carriage integrally provided with an ink cartridge and a print head ejects particles of liquid inks in a dot shape from nozzles of the print head while reciprocating on a print medium in a horizontal direction orthogonal to a sheet feeding direction of the print medium.

Consequently, as in the printing apparatus according to the first aspect of the invention, since the particles of the liquid inks are ejected in the dot shape using the ink jet printer, it is possible to reduce the banding phenomenon.

According to a fifth aspect of the invention, there is provided an image processing apparatus including an image data acquiring unit, an image data dividing unit, a total of pixel-area-concentration-values calculating unit, a pixel area dot constitution table storing unit, a dot constitution calculating unit, a dot arrangement order table storing unit, a dot arranging unit, and a print data generating unit. The image data acquiring unit acquires M-ary (M≧3) image data. The image data dividing unit divides the image data acquired by the image data acquiring unit into plural pixel areas. The total of pixel-area-concentration-values calculating unit calculates a total of concentration values of respective pixels in the plural pixel areas divided by the image data dividing unit. The pixel area dot constitution table storing unit has stored therein a pixel area dot constitution table that designates the total concentration value of each of the pixel areas calculated by the total of pixel-area-concentration-values calculating unit and a dot constitution corresponding to the total concentration value of the pixel area. The dot constitution calculating unit calculates a constitution of dots arranged in the pixel area on the basis of the pixel area dot constitution table. The dot arrangement order table storing unit has stored therein a dot arrangement order table that designates an arrangement order of the dots arranged in the pixel area. The dot arranging unit arranges the dots having the dot constitution calculated by the dot constitution calculating unit in the pixel area in accordance with the arrangement order of the dots designated in the dot arrangement order table of the dot arrangement order table storing unit. The print data generating unit generates print data by combining the respective pixel areas in which the dots are arranged by the dot arranging unit.

Consequently, in particular, it is possible to eliminate the banding phenomenon such as a white streak or a thick streak due to the flight deviation phenomenon or make the banding phenomenon practically inconspicuous. It is possible to freely set (reduce) a pixel area size according to division processing. This makes it possible to obtain a high-quality print. Moreover, an input concentration value and an output concentration value easily coincide with each other. This makes it possible to obtain print data that can display excellent gradation reproducibility in, in particular, a gradation image.

It is preferable that the dot constitution calculating unit calculates an actual number of dots for each dot size classified according to diameters of the dots.

Consequently, it is possible to calculate a dot constitution in the pixel area by defining the dot constitution as, for example, a large (L) size, a medium (M) size, and a small (S) size for each of the sizes of dot diameters. This makes it possible to perform accurate processing.

It is preferable that, in the dot arrangement order table stored in the dot arrangement order table storing unit, the dot arrangement order is designated such that the dots are preferentially arranged in order from a dot having a largest dot diameter in the pixel area.

Consequently, the dots are preferentially arranged in order from a dot having a largest dot diameter in the pixel area and concentrate. This makes it possible to make the banding phenomenon less conspicuous.

It is preferable that, in the dot arrangement order table stored in the dot arrangement order table storing unit, the dot arrangement order is designated such that the dots are arranged substantially in an elliptical shape in the pixel area.

Consequently, the dots concentrate substantially in an elliptical shape in the pixel area. This makes it possible to further make the banding phenomenon less conspicuous.

It is preferable that, in the dot arrangement order table storing unit, the dot arrangement order is designated such that the dots are arranged from a pixel closest to a center of gravity of the pixel area toward the periphery of the pixel area.

Consequently, since the dots are sequentially arranged from the pixel closest to the center of gravity of the pixel area toward the periphery of the pixel area, the dots concentrate in the part of the center of gravity. This makes it possible to further make the banding phenomenon less conspicuous.

It is preferable that, in the dot arrangement order table stored in the dot arrangement order table storing unit, the dot arrangement order is designated such that the dots are arranged over the plural pixel areas and arranged from a predetermined position in the plural pixel areas toward the periphery of the predetermined position.

Consequently, since the dot arrangement order is designated such that the dots are arranged over the plural pixel areas and arranged from the predetermined position in the plural pixel areas toward the periphery of the predetermined position, the dots concentrate not only from the center or the center of gravity portion toward the periphery but also from an arbitrary position. Thus, it is possible to select and use an optimum dot arrangement order table according to, for example, a target image quality and a magnitude of the banding phenomenon or the like. This makes it possible to carry out accurate processing.

It is preferable that the dot arrangement order table storing unit includes two or more kinds of dot arrangement order tables in which dot arrangement orders are different from one another. It is preferable that the dot arranging unit selects one dot arrangement order table out of the dot arrangement order tables stored in the dot arrangement order table storing unit and uses the dot arrangement order table.

Consequently, it is possible to select and use an optimum dot arrangement order table according to, for example, a target image quality and a magnitude of the banding phenomenon or the like. This makes it possible to carry out accurate processing.

It is preferable that the pixel area dot constitution table in the pixel area dot constitution table storing unit designates a constitution ratio for each dot size corresponding to the total concentration value.

Consequently, for example, when the banding phenomenon is conspicuous, a large dot is preferentially selected to reduce the banding phenomenon. When the banding phenomenon is not so conspicuous, a small dot is preferentially selected. This makes it possible to realize improvement of image quality.

It is possible to set the constitution ratio for each dot size corresponding to the total concentration value variable.

It is preferable that, as the constitution ratio for each dot size of the pixel area dot constitution table in the pixel area dot constitution table storing unit, when the total concentration value of the pixel area calculated by the total of pixel-area-concentration-values calculating unit is equal to or lower than a predetermined concentration value, a total number of dots having sizes equal to or smaller than a predetermined size is set larger than a total number of dots having sizes equal to or larger than the predetermined size.

Consequently, when the total concentration value of the pixel area is equal to or lower than the predetermined concentration, the total number of the dots having sizes equal to or smaller than the predetermined size is set larger than the total number of the dots having sizes equal to or larger than the predetermined size. Thus, since concentrating dots are formed mainly from the dots having sizes equal to or smaller than the predetermined size when the total concentration value is low, it is possible to keep down granularity that causes deterioration in image quality. This makes it possible to attain improvement of image quality in the low concentration part. If the concentrating dots are formed mainly from the dots having sizes equal to or larger than the predetermined size instead of the dots having sizes equal to or smaller than the predetermined size, granularity is worsened and the overall image quality is deteriorated.

It is preferable that the dot arranging unit arranges, in arranging the dots in accordance with the dot arrangement order table, the dots after irregularly rotating arrangement positions thereof at a predetermined angle around the center of the pixel area.

Consequently, it is possible to exclude periodicity that causes deterioration in image quality. This makes it possible to attain improvement of image quality in, in particular, identical concentration parts.

It is preferable that the print data generating unit generates, when the M-ary (M≧3) image data acquired by the image data acquiring unit is image data formed of plural colors, print data by combining pixel areas for the respective colors after setting predetermined screen angles in the pixel areas for the respective colors.

Consequently, since the screen angles are set for the respective colors, for example, when a color image is printed, it is possible to prevent occurrence of a moiré phenomenon (interference fringe) among dots having different colors.

It is preferable that the image processing apparatus is an ink jet printer that performs printing when a movable body called a carriage integrally provided with an ink cartridge and a print head ejects particles of liquid inks in a dot shape from nozzles of the print head while reciprocating on a print medium in a horizontal direction orthogonal to a sheet feeding direction of the print medium.

Consequently, since the particles of the liquid inks are ejected in the dot shape using the ink jet printer, it is possible to reduce the banding phenomenon.

According to a sixth aspect of the invention, there is provided an image processing program that causes a computer to function as an image data acquiring unit, an image data dividing unit, a total of pixel-area-concentration-values calculating unit, a pixel area dot constitution table storing unit, a dot constitution calculating unit, a dot arrangement order table storing unit, a dot arranging unit, and a print data generating unit. The image data acquiring unit acquires M-ary (M≧3) image data. The image data dividing unit divides the image data acquired by the image data acquiring unit into plural pixel areas. The total of pixel-area-concentration-values calculating unit calculates a total of concentration values of respective pixels in the plural pixel areas divided by the image data dividing unit. The pixel area dot constitution table storing unit has stored therein a pixel area dot constitution table that designates the total concentration value of each of the pixel areas calculated by the total of pixel-area-concentration-values calculating unit and a dot constitution corresponding to the total concentration value of the pixel area. The dot constitution calculating unit calculates a constitution of dots arranged in the pixel area on the basis of the pixel area dot constitution table. The dot arrangement order table storing unit has stored therein a dot arrangement order table that designates an arrangement order of the dots arranged in the pixel area. The dot arranging unit arranges the dots having the dot constitution calculated by the dot constitution calculating unit in the pixel area in accordance with the arrangement order of the dots designated in the dot arrangement order table of the dot arrangement order table storing unit. The print data generating unit generates print data by combining the respective pixel areas in which the dots are arranged by the dot arranging unit.

Consequently, as in the image processing apparatus according to the fourth aspect of the invention, it is possible to eliminate the banding phenomenon such as a white streak or a thick streak due to the flight deviation phenomenon or make the banding phenomenon practically inconspicuous. It is possible to freely set (reduce) a pixel area size according to division processing. This makes it possible to obtain a high-quality print. Moreover, an input concentration value and an output concentration value easily coincide with each other. This makes it possible to display excellent gradation reproducibility in, in particular, a gradation image.

Almost all printing apparatuses such as an ink jet printer currently placed on the market include a computer system including a central processing unit (CPU), storage devices (a RAM and a ROM), and input-output devices. It is possible to realize the respective units described above with software using the computer system. This makes it possible to economically and easily realize the respective units compared with the case in which dedicated hardware is created to realize the respective units. Moreover, it is possible to easily perform upgrade of the image processing program through modification, improvement, and the like of functions by rewriting a part of the program.

It is preferable that the dot constitution calculating unit calculates an actual number of dots for each dot size classified according to diameters of the dots.

Consequently, as in the image processing apparatus according to the fourth aspect of the invention, it is possible to calculate a dot constitution in the pixel area by defining the dot constitution as, for example, a large (L) size, a medium (M) size, and a small (S) size for each of the sizes of dot diameters. This makes it possible to perform accurate processing.

As described above, it is possible to realize the respective units with software using the computer system included in almost all the printing apparatuses currently placed on the market. This makes it possible to economically and easily realize the respective units compared with the case in which dedicated hardware is created to realize the respective units. Moreover, it is possible to easily perform upgrade of the image processing program through modification, improvement, and the like of functions by rewriting a part of the program.

It is preferable that, in the dot arrangement order table stored in the dot arrangement order table storing unit, the dot arrangement order is designated such that the dots are preferentially arranged in order from a dot having a largest dot diameter in the pixel area.

Consequently, as in the image processing apparatus according to the fourth aspect of the invention, the dots are preferentially arranged in order from a dot having a largest dot diameter in the pixel area and concentrate. This makes it possible to make the banding phenomenon less conspicuous.

As described above, it is possible to realize the respective units with software using the computer system included in almost all the printing apparatuses currently placed on the market. This makes it possible to economically and easily realize the respective units compared with the case in which dedicated hardware is created to realize the respective units. Moreover, it is possible to easily perform upgrade of the printing program through modification, improvement, and the like of functions by rewriting a part of the program.

It is preferable that, in the dot arrangement order table stored in the dot arrangement order table storing unit, the dot arrangement order is designated such that the dots are arranged substantially in an elliptical shape in the pixel area.

Consequently, as in the image processing apparatus according to the fourth aspect of the invention, the dots concentrate substantially in an elliptical shape in the pixel area. This makes it possible to further make the banding phenomenon less conspicuous.

As described above, it is possible to realize the respective units with software using the computer system included in almost all the printing apparatuses currently placed on the market. This makes it possible to economically and easily realize the respective units compared with the case in which dedicated hardware is created to realize the respective units. Moreover, it is possible to easily perform upgrade of the image processing program through modification, improvement, and the like of functions by rewriting a part of the program.

It is preferable that, in the dot arrangement order table storing unit, the dot arrangement order is designated such that the dots are arranged from a pixel closest to a center of gravity of the pixel area toward the periphery of the pixel area.

Consequently, as in the image processing apparatus according to the fourth aspect of the invention, since the dots are sequentially arranged from the pixel closest to the center of gravity of the pixel area toward the periphery of the pixel area, the dots concentrate in the part of the center of gravity. This makes it possible to further make the banding phenomenon less conspicuous.

The "center of gravity" in the description "from the pixel closest to the center of gravity of the pixel area toward the periphery of the pixel area" means the "center" of the pixel area. This description means that the dots are arranged to be concentrated from the center toward the periphery.

As described above, it is possible to realize the respective units with software using the computer system included in almost all the printing apparatuses currently placed on the market. This makes it possible to economically and easily realize the respective units compared with the case in which dedicated hardware is created to realize the respective units. Moreover, it is possible to easily perform upgrade of the image processing program through modification, improvement, and the like of functions by rewriting a part of the program.

It is preferable that, in the dot arrangement order table stored in the dot arrangement order table storing unit, the dot arrangement order is designated such that the dots are arranged over the plural pixel areas and arranged from a predetermined position in the plural pixel areas toward the periphery of the predetermined position.

Consequently, as in the image processing apparatus according to the fourth aspect of the invention, since the dot arrangement order is designated such that the dots are arranged over the plural pixel areas and arranged from the predetermined position in the plural pixel areas toward the periphery of the predetermined position, the dots concentrate not only from the center or the center of gravity portion toward the periphery but also from an arbitrary position. Thus, it is possible to select and use an optimum dot arrangement order table according to, for example, a target image quality and a magnitude of the banding phenomenon or the like. This makes it possible to carry out accurate processing.

As described above, it is possible to realize the respective units with software using the computer system included in almost all the printing apparatuses currently placed on the market. This makes it possible to economically and easily realize the respective units compared with the case in which dedicated hardware is created to realize the respective units. Moreover, it is possible to easily perform upgrade of the image processing program through modification, improvement, and the like of functions by rewriting a part of the program.

It is preferable that the dot arrangement order table storing unit includes two or more kinds of dot arrangement order tables in which dot arrangement orders are different from one another. It is preferable that the dot arranging unit selects one dot arrangement order table out of the dot arrangement order tables stored in the dot arrangement order table storing unit and uses the dot arrangement order table.

Consequently, as in the image processing apparatus according to the fourth aspect of the invention, it is possible to select and use an optimum dot arrangement order table according to, for example, a target image quality and a magnitude of the banding phenomenon or the like. This makes it possible to carry out accurate processing.

As described above, it is possible to realize the respective units with software using the computer system included in almost all the printing apparatuses currently placed on the market. This makes it possible to economically and easily realize the respective units compared with the case in which dedicated hardware is created to realize the respective units. Moreover, it is possible to easily perform upgrade of the image processing program through modification, improvement, and the like of functions by rewriting a part of the program.

It is preferable that the pixel area dot constitution table in the pixel area dot constitution table storing unit designates a constitution ratio for each dot size corresponding to the total concentration value.

Consequently, as in the image processing apparatus according to the fourth aspect of the invention, for example, when the banding phenomenon is conspicuous, a large dot is preferentially selected to reduce the banding phenomenon. When the banding phenomenon is not so conspicuous, a small dot is preferentially selected. This makes it possible to realize improvement of image quality.

As described above, it is possible to realize the respective units with software using the computer system included in almost all the printing apparatuses currently placed on the market. This makes it possible to economically and easily realize the respective units compared with the case in which dedicated hardware is created to realize the respective units. Moreover, it is possible to easily perform upgrade of the image processing program through modification, improvement, and the like of functions by rewriting a part of the program.

It is preferable that, as the constitution ratio for each dot size of the pixel area dot constitution table in the pixel area dot constitution table storing unit, when the total concentration value of the pixel area calculated by the total of pixel-area-concentration-values calculating unit is equal to or lower than a predetermined concentration value, a total number of dots having sizes equal to or smaller than a predetermined size is set larger than a total number of dots having sizes equal to or larger than the predetermined size.

Consequently, as in the image processing apparatus according to the fourth aspect of the invention, when the total concentration value of the pixel area is equal to or lower than the predetermined concentration, the total number of the dots having sizes equal to or smaller than the predetermined size is set larger than the total number of the dots having sizes equal to or larger than the predetermined size. Thus, since concentrating dots are formed mainly from the dots having sizes equal to or smaller than the predetermined size when the total concentration value is low, it is possible to keep down granularity that causes deterioration in image quality. This makes it possible to attain improvement of image quality in the low concentration part. If the concentrating dots are formed mainly from the dots having sizes equal to or larger than the predetermined size instead of the dots having sizes equal to or smaller than the predetermined size, granularity is worsened and the overall image quality is deteriorated.

As described above, it is possible to realize the respective units with software using the computer system included in almost all the printing apparatuses currently placed on the market. This makes it possible to economically and easily realize the respective units compared with the case in which dedicated hardware is created to realize the respective units. Moreover, it is possible to easily perform upgrade of the image processing program through modification, improvement, and the like of functions by rewriting a part of the program.

It is preferable that the dot arranging unit arranges, in arranging the dots in accordance with the dot arrangement order table, the dots after irregularly rotating arrangement positions thereof at a predetermined angle around the center of the pixel area.

Consequently, as in the image processing apparatus according to the fourth aspect of the invention, it is possible to exclude periodicity that causes deterioration in image quality. This makes it possible to attain improvement of image quality in, in particular, identical concentration parts.

As described above, it is possible to realize the respective units with software using the computer system included in almost all the printing apparatuses currently placed on the market. This makes it possible to economically and easily realize the respective units compared with the case in which dedicated hardware is created to realize the respective units. Moreover, it is possible to easily perform upgrade of the image processing program through modification, improvement, and the like of functions by rewriting a part of the program.

It is preferable that the print data generating unit generates, when the M-ary ($M \geq 3$) image data acquired by the image data acquiring unit is image data formed of plural colors, print data by combining pixel areas for the respective colors after setting predetermined screen angles in the pixel areas for the respective colors.

Consequently, as in the image processing apparatus according to the fourth aspect of the invention, since the screen angles are set for the respective colors, for example, when a color image is printed, it is possible to prevent occurrence of a moiré phenomenon (interference fringe) among dots having different colors.

As described above, it is possible to realize the respective units with software using the computer system included in almost all the printing apparatuses currently placed on the market. This makes it possible to economically and easily realize the respective units compared with the case in which dedicated hardware is created to realize the respective units. Moreover, it is possible to easily perform upgrade of the image processing program through modification, improvement, and the like of functions by rewriting a part of the program.

It is preferable that the image processing program causes the computer to function as an ink jet printer that performs printing when a movable body called a carriage integrally provided with an ink cartridge and a print head ejects particles of liquid inks in a dot shape from nozzles of the print head while reciprocating on a print medium in a horizontal direction orthogonal to a sheet feeding direction of the print medium.

Consequently, as in the image processing apparatus according to the fourth aspect of the invention, since the particles of the liquid inks are ejected in the dot shape using the ink jet printer, it is possible to reduce the banding phenomenon.

As described above, it is possible to realize the respective units with software using the computer system included in almost all the printing apparatuses currently placed on the market. This makes it possible to economically and easily realize the respective units compared with the case in which dedicated hardware is created to realize the respective units. Moreover, it is possible to easily perform upgrade of the image processing program through modification, improvement, and the like of functions by rewriting a part of the program.

According to a seventh aspect of the invention, there is provided a computer readable recording medium having recorded therein the image processing program described above.

Consequently, it is possible to easily and surely provide consumers such as users with the image processing program described above via computer readable recording media such as a CD-ROM, a DVD-ROM, an FD, and a semiconductor chip.

An image processing method according to an eighth aspect of the invention, there is provided a printing method including an image data acquiring step, an image data dividing step, a total of pixel-area-concentration-values calculating step, a pixel area dot constitution table storing step, a dot constitution calculating step, a dot arrangement order table storing step, a dot arranging step, and a print data generating step. In the image data acquiring step, M-ary (M≧3) image data is acquired. In the image data dividing step, the image data acquired in the image data acquiring step is divided into plural pixel areas. In the total of pixel-area-concentration-values calculating step, a total of concentration values of respective pixels in the plural pixel areas divided in the image data dividing step is calculated. In the pixel area dot constitution table storing step, a pixel area dot constitution table that designates the total concentration value of each of the pixel areas calculated in the total of pixel-area-concentration-values calculating step and a dot constitution corresponding to the total concentration value of the pixel area is stored. In the dot constitution calculating step, a constitution of dots arranged in the pixel area is calculated on the basis of the pixel area dot constitution table. In the dot arrangement order table storing step, dot arrangement order table that designates an arrangement order of the dots arranged in the pixel area is stored. In the dot arranging step, the dots having the dot constitution calculated in the dot constitution calculating step in accordance with the arrangement order of the dots designated in the dot arrangement order table in the dot arrangement order table storing step are arranged in the pixel area. In the print data generating step, print data is generated by combining the respective pixel areas in which the dots are arranged in the dot arranging step.

Consequently, as in the image processing apparatus according to the fourth aspect of the invention, it is possible to eliminate the banding phenomenon such as a white streak or a thick streak due to the flight deviation phenomenon or make the banding phenomenon practically inconspicuous. It is possible to freely set (reduce) a pixel area size according to division processing. This makes it possible to obtain a high-quality print. Moreover, an input concentration value and an output concentration value easily coincide with each other. This makes it possible to display excellent gradation reproducibility in, in particular, a gradation image.

It is preferable that, in the dot constitution calculating step, an actual number of dots for each dot size classified according to diameters of the dots is calculated.

Consequently, as in the image processing apparatus according to the fourth aspect of the invention, it is possible to calculate a dot constitution in the pixel area by defining the dot constitution as, for example, a large (L) size, a medium (M) size, and a small (S) size for each of the sizes of dot diameters. This makes it possible to perform accurate processing.

It is preferable that, in the dot arrangement order table stored in the dot arrangement order table storing step, the dot arrangement order is designated such that the dots are preferentially arranged in order from a dot having a largest dot diameter in the pixel area.

Consequently, as in the image processing apparatus according to the fourth aspect of the invention, the dots are preferentially arranged in order from a dot having a largest dot diameter in the pixel area and concentrate. This makes it possible to make the banding phenomenon less conspicuous.

It is preferable that, in the dot arrangement order table stored in the dot arrangement order table storing step, the dot arrangement order is designated such that the dots are arranged substantially in an elliptical shape in the pixel area.

Consequently, as in the image processing apparatus according to the fourth aspect of the invention, the dots concentrate substantially in an elliptical shape in the pixel area. This makes it possible to further make the banding phenomenon less conspicuous.

It is preferable that, in the dot arrangement order table storing step, the dot arrangement order is designated such that the dots are arranged from a pixel closest to a center of gravity of the pixel area toward the periphery of the pixel area.

Consequently, as in the image processing apparatus according to the fourth aspect of the invention, since the dots are sequentially arranged from the pixel closest to the center of gravity of the pixel area toward the periphery of the pixel area, the dots concentrate in the part of the center of gravity. This makes it possible to further make the banding phenomenon less conspicuous.

It is preferable that, in the dot arrangement order table stored in the dot arrangement order table storing step, the dot arrangement order is designated such that the dots are arranged over the plural pixel areas and arranged from a predetermined position in the plural pixel areas toward the periphery of the predetermined position.

Consequently, as in the image processing apparatus according to the fourth aspect of the invention, since the dot arrangement order is designated such that the dots are arranged over the plural pixel areas and arranged from the predetermined position in the plural pixel areas toward the periphery of the predetermined position, the dots concentrate not only from the center or the center of gravity portion toward the periphery but also from an arbitrary position. Thus, it is possible to select and use an optimum dot arrangement order table according to, for example, a target image quality and a magnitude of the banding phenomenon or the like. This makes it possible to carry out accurate processing.

It is preferable that, in the dot arrangement order table storing step, two or more kinds of dot arrangement order tables in which dot arrangement orders are different from one another are provided. It is preferable that, in the dot arranging step, one dot arrangement order table out of the dot arrangement order tables stored in the dot arrangement order table storing step is selected and used.

Consequently, as in the image processing apparatus according to the fourth aspect of the invention, it is possible to select and use an optimum dot arrangement order table according to, for example, a target image quality and a magnitude of the banding phenomenon or the like. This makes it possible to carry out accurate processing.

It is preferable that the pixel area dot constitution table stored in the pixel area dot constitution table storing step designates a constitution ratio for each dot size corresponding to the total concentration value.

Consequently, as in the image processing apparatus according to the fourth aspect of the invention, for example, when the banding phenomenon is conspicuous, a large dot is preferentially selected to reduce the banding phenomenon. When the banding phenomenon is not so conspicuous, a small dot is preferentially selected. This makes it possible to realize improvement of image quality.

It is preferable that, as the constitution ratio for each dot size of the pixel area dot constitution table stored in the pixel area dot constitution table storing step, when the total concentration value of the pixel area calculated in the total of pixel-area-concentration-values calculating step is equal to or lower than a predetermined concentration value, a total number of dots having sizes equal to or smaller than a predetermined size is set larger than a total number of dots having sizes equal to or larger than the predetermined size.

Consequently, as in the image processing apparatus according to the fourth aspect of the invention, when the total concentration value of the pixel area is equal to or lower than the predetermined concentration, the total number of the dots having sizes equal to or smaller than the predetermined size is set larger than the total number of the dots having sizes equal to or larger than the predetermined size. Thus, since concentrating dots are formed mainly from the dots having sizes equal to or smaller than the predetermined size when the total concentration value is low, it is possible to keep down granularity that causes deterioration in image quality. This makes it possible to attain improvement of image quality in the low concentration part. If the concentrating dots are formed mainly from the dots having sizes equal to or larger than the predetermined size instead of the dots having sizes equal to or smaller than the predetermined size, granularity is worsened and the overall image quality is deteriorated.

It is preferable that, in the dot arranging step, in arranging the dots in accordance with the dot arrangement order table, the dots are arranged after arrangement positions thereof are irregularly rotated at a predetermined angle around the center of the pixel area.

Consequently, as in the image processing apparatus according to the fourth aspect of the invention, it is possible to exclude periodicity that causes deterioration in image quality. This makes it possible to attain improvement of image quality in, in particular, identical concentration parts.

It is preferable that, in the print data generating step, when the M-ary ($M \geq 3$) image data acquired in the image data acquiring step is image data formed of plural colors, print data is generated by combining pixel areas for the respective colors after setting predetermined screen angles in the pixel areas for the respective colors.

Consequently, as in the image processing apparatus according to the fourth aspect of the invention, since the screen angles are set for the respective colors, for example, when a color image is printed, it is possible to prevent occurrence of a moiré phenomenon (interference fringe) among dots having different colors.

It is preferable that the printing method is a printing method for an ink jet printer that performs printing when a movable body called a carriage integrally provided with an ink cartridge and a print head ejects particles of liquid inks in a dot shape from nozzles of the print head while reciprocating on a print medium in a horizontal direction orthogonal to a sheet feeding direction of the print medium.

Consequently, as in the image processing apparatus according to the fourth aspect of the invention, since the particles of the liquid inks are ejected in the dot shape using the ink jet printer, it is possible to reduce the banding phenomenon.

BRIEF DESCRIPTION OF THE DRAWINGS

The invention will be described with reference to the accompanying drawings, wherein like numbers reference like elements.

FIG. 8 is a diagram showing a representative example of a pixel area dot constitution table that designates a relation between total concentration values in a pixel area and dots.

FIG. 9 is a diagram showing a specific example of a pixel area dot constitution table that designates a relation between total concentration values (0 to 2112) in a pixel area and dots.

FIG. 10 is a diagram showing a specific example of a pixel area dot constitution table that designates a relation between total concentration values (2176 to 4736) in a pixel area and dots.

FIG. 11 is a diagram showing a specific example of a pixel area dot constitution table that designates a relation between total concentration values (4800 to 7360) in a pixel area and dots.

FIG. 12 is a diagram showing a specific example of a pixel area dot constitution table that designates a relation between total concentration values (7424 to 9984) in a pixel area and dots.

FIG. 13 is a diagram showing a specific example of a pixel area dot constitution table that designates a relation between total concentration values (10048 to 12608) in a pixel area and dots.

FIG. 14 is a diagram showing a specific example of a pixel area dot constitution table that designates a relation between total concentration values (12672 to 15232) in a pixel area and dots.

FIG. 15 is a diagram showing a specific example of a pixel area dot constitution table that designates a relation between total concentration values (15296 to 16320) in a pixel area and dots.

FIG. 17 is a diagram showing an example of a dot arrangement order table.

FIG. 18 is a diagram for explaining a method of calculating a center of gravity position of a pixel area.

FIG. 19 is a diagram showing an example of an actual number of dots calculating method.

FIG. 23 is a diagram showing an example of actual dot arrangement based on the dot arrangement order table.

FIG. 32 is a diagram showing a pixel area dot constitution table in the case in which there are plural types of predetermined pixel areas.

FIG. 33 is a diagram showing a dot arrangement order table in the embodiment in the case in which concentrating dots are not in the center of a predetermined pixel area.

FIG. 34 is a diagram showing a dot arrangement order table in which the pixel area shown in FIG. 33 is collected by a number equal to or larger than two.

DESCRIPTION OF EXEMPLARY EMBODIMENTS

Exemplary embodiments of the invention will be hereinafter explained in detail with reference to the accompanying drawings.

FIGS. 1 to 31 are diagrams showing a printing apparatus 100, a printing program, a printing method, an image processing apparatus, an image processing program, an image processing method, and a computer readable recording medium according to an embodiment of the invention.

Figure 1:
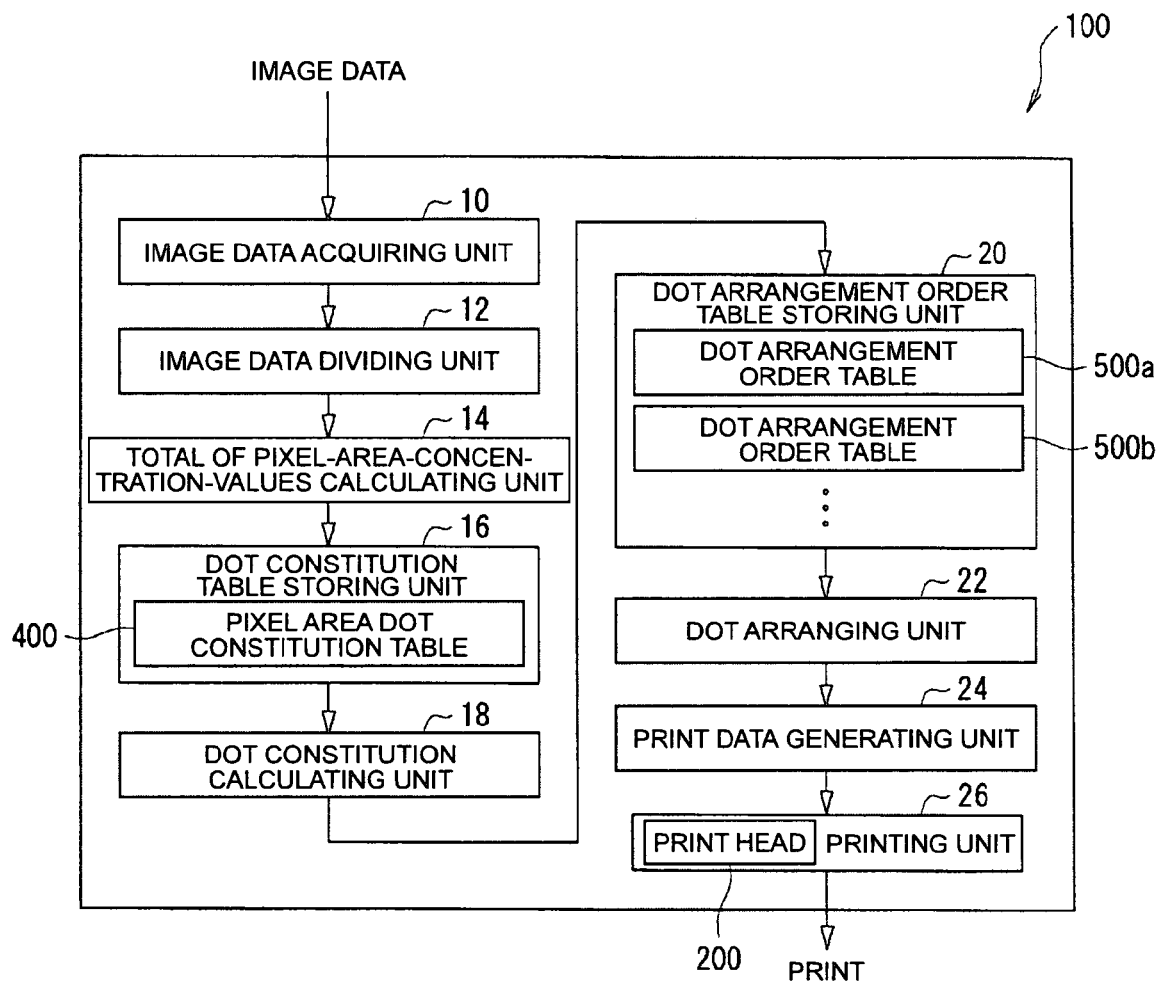
FIG. 1 is a functional block diagram showing a printing apparatus according to an embodiment of the invention.

FIG. 1 is a functional block diagram of the printing apparatus 100 according to the embodiment of the invention.

As shown in the figure, the printing apparatus 100 mainly includes an image data acquiring unit 10, an image data dividing unit 12, a total of pixel-area-concentration-values calculating unit 14, a pixel area dot constitution table storing unit 16, a dot constitution calculating unit 18, a dot arrangement order table storing unit 20, a dot arranging unit 22, a print data generating unit 24, an ink jet printing unit 26, and a print head 200. The image data acquiring unit 10 acquires multi-valued image data. The image data dividing unit 12 divides the image data acquired by the image data acquiring unit 10 into pixel areas. The total of pixel-area-concentration-values calculating unit 14 calculates a total of concentration values of respective pixels in each of the pixel areas divided by the image data dividing unit 12. The pixel area dot constitution table storing unit 16 has stored therein a pixel area dot constitution table 400 that designates the total concentration value of the pixel area calculated by the total of pixel-area-concentration-values calculating unit 14 and a dot constitution corresponding to the total concentration value of the pixel area. The dot constitution calculating unit 18 calculates a constitution of dots arranged in the pixel area on the basis of the pixel area dot constitution table 400. The dot arrangement order table storing unit 20 has stored therein dot arrangement order tables 500a and 500b that designate an arrangement order of the dots arranged in the pixel area. The dot arranging unit 22 arranges the dots having the dot constitution calculated by the dot constitution calculating unit 18 in the pixel area in accordance with the arrangement order of the dots designated in the dot arrangement order tables 500a and 500b of the dot arrangement order table storing unit 20. The print data generating unit 24 generates print data by combining the respective pixel areas in which the dots are arranged by the dot arranging unit 22. The ink jet printing unit 26 executes printing on the basis of the print data generated by the print data generating unit 24. Furthermore, the print data generating unit 24 contains even what the printing converts to possible data, as occasion demands. The print head 200 is used in the printing unit 26.

The print head 200 applied to the embodiment of the invention will be explained.

Figure 3:
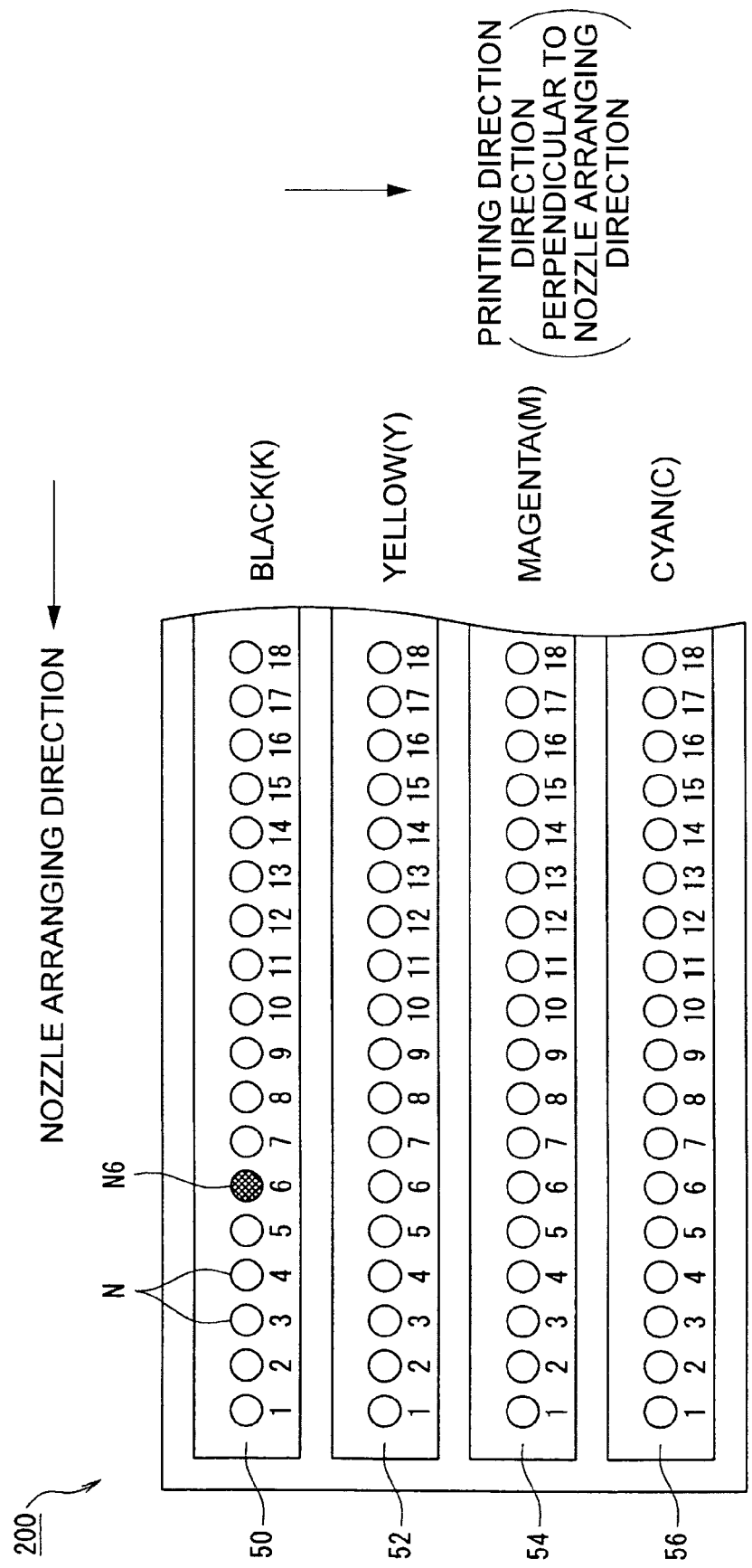
FIG. 3 is a partial enlarged bottom view showing a structure of a print head according to the embodiment of the invention.
Figure 4:
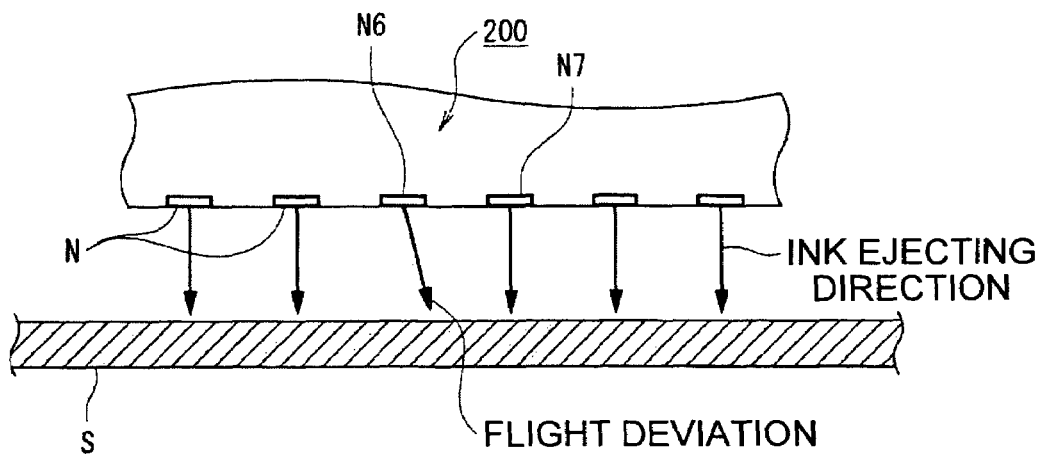
FIG. 4 is a partial enlarged side view showing the structure of the print head according to the embodiment of the invention.

FIG. 3 is a partial enlarged bottom view showing a structure of the print head 200. FIG. 4 is a partial enlarged sectional view of the print head 200.

As shown in FIG. 3, the print head 200 has an elongated structure extending in a paper width direction of a printing sheet used for a so-called line head printer. In the print head 200, four nozzle modules 50, 52, 54, and 56 are integrally arranged to be laid one on top of another in a sheet feeding direction (a sub-scanning direction). The nozzle module 50 is a black nozzle module in which plural (eighteen in the figure) nozzles N that solely eject a black (K) ink are linearly arranged in a main scanning direction. The nozzle module 52 is a yellow nozzle module 52 in which plural nozzles N that solely eject a yellow (Y) ink are linearly arranged in the main scanning direction. The nozzle module 54 is a magenta nozzle module in which plural nozzles N that solely eject a magenta (M) ink are linearly arranged in the main scanning direction. The nozzle module 56 is a cyan nozzle module in which plural nozzles N that solely eject a cyan (C) ink are linearly arranged in the main scanning direction. In the case of a print head for monochrome printing, only the black (K) nozzle module may be used. In the case of a print head for printing a high-quality image, nozzle modules that eject six or seven colors including light magenta, light cyan, and the like in addition to the four colors may be used. The number of nozzles included in one nozzle module depends on resolution of a printer. Thus, the number of nozzles is not specifically limited. However, for example, in the case of a multi-path printer described later, the number is often about 180. In the case of the line head printer, the number is often about one thousand and several hundreds.

FIG. 4 is a diagram showing, for example, the black nozzle module 50 among the four nozzle modules 50, 52, 54, and 56 viewed from a side thereof. In a state shown in the figure, a nozzle N6 in the sixth place from the left causes a flight deviation phenomenon, an ink is ejected from the nozzle N6 in an oblique direction, and a dot is printed (the ink arrives) near a normal nozzle N7 next to the nozzle N6.

Figure 5:
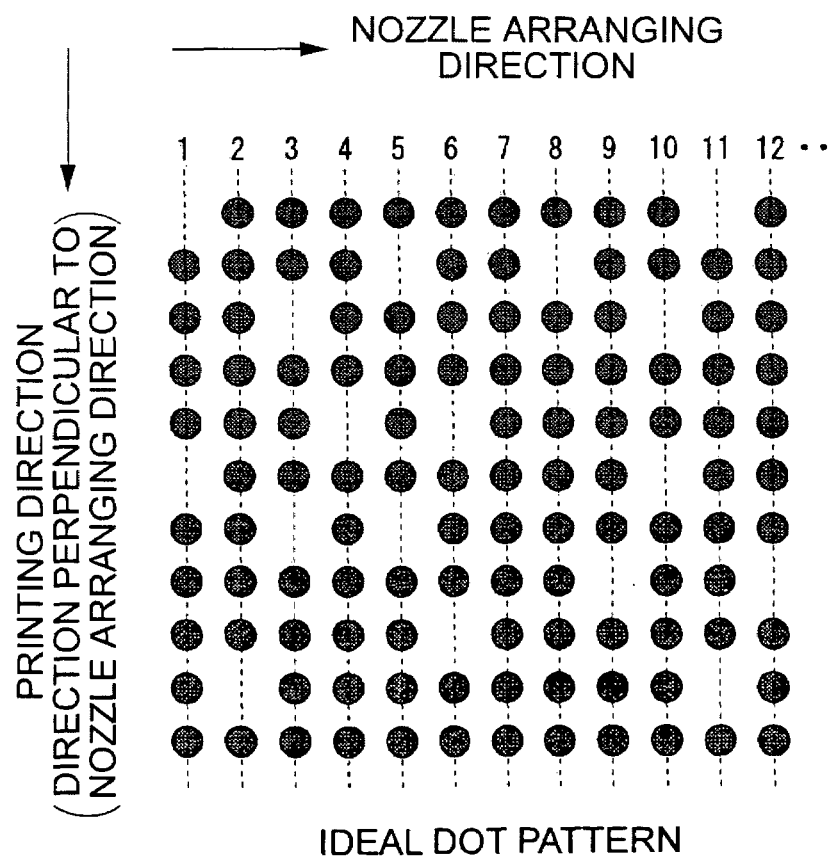
FIG. 5 is a conceptual diagram showing an example of an ideal dot pattern in which a flight deviation phenomenon does not occur.

Therefore, when printing is executed using the black nozzle module 50, as shown in FIG. 5, all dots are printed in specified print positions in a state in which flight deviation is not caused (an ideal dot pattern). On the other hand, as shown in FIG. 6, for example, when the nozzle N6 in the sixth place from the left causes the flight deviation phenomenon, a dot print position of the nozzle N6 deviates from a target print position to the normal nozzle N7 side next to the nozzle N6 by a distance "a".

Figure 6:
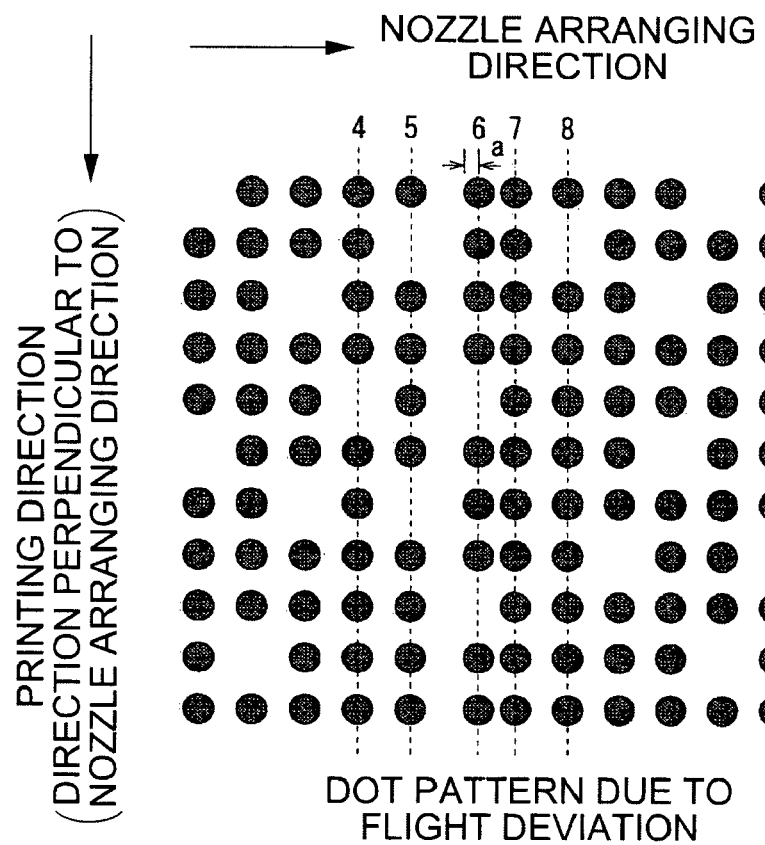
FIG. 6 is a conceptual diagram showing an example of a dot pattern formed because of the flight deviation phenomenon of one nozzle.

In examples in FIGS. 4 and 6, in order to plainly explain the flight deviation phenomenon, only one nozzle causes the flight deviation phenomenon. However, as described later, in an actual print head, in general, almost all nozzles of the print head cause the flight deviation phenomenon more or less. It is considered that this characteristic of the print head 200 is fixed to some extent in a manufacturing stage and relatively rarely changes after manufacturing except a change due to ejection failure due to ink clogging.

In examples in FIGS. 5 and 6, in order to plainly explain the flight deviation phenomenon, dot patterns are formed of only dots of one size. However, it is known that, even if amounts of flight deviation are the same, depending on a combination of dot sizes, that is, a concentration of a section of the dots, a large difference occurs in a degree of conspicuousness of a banding phenomenon of the dots. In other words, in general, the banding phenomenon has a characteristic that the banding phenomenon is relatively inconspicuous in a section where a concentration is high or low and is conspicuous in a section where a concentration is medium. It is known that the banding phenomenon has a characteristic that the banding phenomenon is also different depending on a color of an ink and is conspicuous in a deep color such as black and is relatively inconspicuous in a light color such as yellow, light cyan, and light magenta.

The image data acquiring unit 10 provides a function of acquiring multi-valued (M-ary) color image data for printing, which is sent from a print instructing apparatus (not shown) such as a personal computer (PC) or a printer server connected to the printing apparatus 100, via a network or the like or acquiring the color image data by directly reading the color image data from a not-shown image (data) reading device or the like such as a scanner or a CD-ROM drive. If the multi-valued color image data acquired is multi-valued RGB data, for example, image data in which a gradation (a luminance value) for each of colors (R, G, and B) per one pixel is represented by 8 bits and 256 gradations (0 to 255), the image data acquiring unit 10 simultaneously displays a function of subjecting the image data to color conversion processing to convert the image data into multi-valued CMYK (in the case of four colors) data corresponding to the respective inks of the print head 200.

The image data dividing unit 12 provides a function of dividing the image data acquired by the image data acquiring unit 10 into plural areas for each of predetermined pixel areas.

A size for division of the pixel area by the image data dividing unit 12 is not specifically limited. As the division size is smaller, the division affects image quality less and a print of a higher image quality is obtained. On the contrary, an amount of information processing increases and a longer processing time is required because of the division size. It is also possible that, depending on a magnitude of banding, the banding cannot be prevented sufficiently. Thus, for example, it is considered that a size of about 8×8 pixels (in the case of color image data, 8×8 pixels for each color) is optimum.

Therefore, for example, when the image data acquired by the image data acquiring unit 10 has a size of 720×720 pixels, the image data is divided into "225 ((720×720)/(8×8))" pixel areas. A division size of pixel areas by the image data dividing unit 12 is not limited to one size. It is also possible to simultaneously adopt plural sizes as long as the sizes can be constituted by dots in the pixel area dot constitution table 400 as described later.

The total of pixel-area-concentration-values calculating unit 14 provides a function of calculating a total of concentration values of respective pixels in each of the pixel areas divided by the image data dividing unit 12. For example, when it is assumed that the number of pixels of each of the pixel areas is "64 (8×8)" and a concentration values of the pixels is represented by 8 bits and 256 (0 to 255) gradations as described above, a total concentration value of the pixel area is calculated in a range of "0 (0×64)" to "16320 (255×64)" by totaling all concentration values of the respective pixels. When the image data is color image data as described above, a total concentration value of a pixel area for each color is calculated.

The pixel area dot constitution table storing unit 16 stores at least one or more kinds of pixel area dot constitution tables 400 that designate the total concentration value of each of the pixel areas calculated by the total of pixel-area-concentration-values calculating unit 14 and a dot constitution corresponding to the total concentration value of the pixel area. It is possible to read out and use a predetermined pixel area dot constitution table 400 as required.

FIGS. 8 to 15 are diagrams showing examples of the pixel area dot constitution table 400. FIG. 8 is a diagram showing a representative example of a pixel area dot constitution table 400a. FIGS. 9 to 15 are diagrams showing a detailed example of a pixel area dot constitution table 400b.

The pixel area dot constitution table 400 defines, according to a total concentration value of respective pixels in a pixel area, a set dot ratio of dots provided in the pixel area and specifically defines the number of dots actually arranged according to the set dot ratio, dot types (dot sizes) of the dots, and a total number of the dots.

For example, in the pixel area dot constitution table (8×8 pixel areas and four gradations) 400a shown in FIG. 8, when a concentration value average of respective pixels in a pixel area is "0 (8 bits and 256 gradations)", a total pixel value in the pixel area is "0" and all of a dot ratio, an actual number of dots, and a total of actual numbers of dots are "0". However, when a concentration value average of respective pixels in a pixel area is "30 (8 bits and 256 gradations)", a total pixel value in the pixel area is "1920 (30×64) and, as a set dot ratio for the pixels, a ratio of dot of an L size (large dots) is "0", a ratio of dots of an M size (medium dots) is "0", and a ratio of dots of an S size (small dots) is "1". As an actual number of dots, an actual number of the dots of the L size and an actual number of the dots of the M size are "0" and only an actual number of the dots of the S size is "23". A total of the numbers of dots is also "23". In other words, when the concentration value average of the respective pixels is "30" in this way, a total concentration in the pixel area is represented only by twenty-three dots of the S size.

As shown in the figure, when a concentration value average of the respective pixels in the pixel area is "70 (8 bits and 256 gradations), a total pixel value in the pixel area is "4480 (70×64)" and, as a set dot ratio of the dots, a ratio of the L dots is "0", a ratio of the M dots is "1", and a ratio of the S dots is "1". As an actual number of dots, an actual number of the L dots is "0", an actual number of the M dots is "18", and an actual number of the S dots is "17". A total of the numbers of dots is "35". In other words, when the concentration value average of the respective pixels is "70" in this way, a total concentration in the pixel area is represented by eighteen M dots and seventeen S dots substantially equal to the number of the M dots, that is, thirty-five dots in total.

Similarly, in the figure, when a concentration value average of the respective pixels in the pixel area is "125 (8 bits and 256 gradations), a total pixel value in the pixel area is "8000 (125×64)" and, as a set dot ratio of the dots, a ratio of the L dots is "1", a ratio of the M dots is "1", and a ratio of the S dots is "1". As an actual number of dots, an actual number of the L dots is "16", an actual number of the M dots is "15", and an actual number of the S dots is "16", which are substantially equal to one another. A total of the numbers of dots is "47", which is about three times as large as the number of each type of the dots. In other words, when the concentration value average of the respective sizes is "125" in this way, all the set dot ratios and the actual numbers of dots for the L, M, and S size dots are equal and a total concentration in the pixel area is represented by the dots of the respective sizes.

The pixel area dot constitution table 400b in FIGS. 9 to 15 designates all patterns with average concentration values of respective pixels of "0" to "255" in the case in which a concentration value of each of the pixels in the pixel area is represented by 8 bits and 256 gradations. Consequently, it is always possible to automatically select any one of the patterns when a concentration value of the respective pixels in the pixel area is represented by 8 bits and 256 gradations.

Figure 7:
FIG. 7 is a dot type table that defines a relation between dot types and concentrations.

FIG. 7 is a diagram showing a relation between dot sizes of the respective dots in the pixel area and concentration values (8 bits and 256 gradations). Dot types are four types (dot type numbers "0" to "3") including "no dot" and dot sizes and concentration values for the respective dot types are designated. A dot size in the case of the dot type number "0" is "no dot" and a concentration value is "0". A dot size in the case of the dot type number "1" is the "S size (small dot)" and a concentration value of the dot is "85". A dot size in the case of the dot type number "2" is the "M size (medium dot)" and a concentration value of the dot is "170". A dot size in the case of the dot type number "3" is the "L size (large dot)" and a concentration value of the dot is "255".

Therefore, as designated in the pixel area dot constitution table 400a in FIG. 8, when an average concentration value of the respective pixels is "30" and a total concentration value of the pixel area is "1920", by using twenty-three "S dots" with a concentration value "85", a total concentration value of the S dots is set to "1955 (85×23)". Thus, it is possible to substantially accurately represent a total concentration value of the pixel area.

As shown in the figure, when an average concentration value of the respective pixels is "125" and a total concentration value of the pixel area is "8000", by using sixteen "S dots" with a concentration value "85", fifteen "M dots" with a concentration value "170", and sixteen "L dots" with a concentration value "255", a total concentration value of the S dots is set to "1360 (85×16)", a total concentration value of the M dots is set to "2550 (170×15)", and a total concentration value of the L dots is set to "4080 (255×16)". Thus, the total concentration value comes to "7990", and it is possible to substantially accurately represent a total concentration value (8000) of the pixel area (the same holds true for other average concentration values and total concentration values).

The dot constitution calculating unit 18 provides a function of calculating a constitution of dots arranged in the pixel area on the basis of the pixel area dot constitution table 400. For example, when a total of concentration values of the respective pixels in each of the pixel areas is "4100", referring to the pixel area dot constitution table 400b in FIG. 10, a total concentration value in an item with an average concentration value "64" indicated by an arrow in the figure (*1) is closest to the actual concentration total value "4100". Thus, a constitution ratio and an actual number of dots of set dots are calculated in accordance with this item. As a result, when the total of concentration values of the respective pixels in each of the pixel areas is "4100", as a dot constitution ratio of the pixels, a ratio of the L dots is "0", a ratio of the M dots is "1", and a ratio of the S dots is "1". Thus, sixteen M dots and sixteen S dots (a dot total concentration value="4080") are calculated as a constitution of the dots arranged in the pixel area.

When a total of concentration values of the respective pixels in each of the pixel areas is "10500", referring to the pixel area dot constitution table 400b in FIG. 13, a total concentration value in an item with an average concentration value "164" indicated by an arrow in the figure (*2) is closest to the actual concentration total value "10500". Thus, a constitution ratio and an actual number of dots of set dots are calculated in accordance with this item. As a result, when a total of concentration values of the respective pixels in each of the pixel areas is "10500", as a dot constitution ratio of the pixels, a ratio of the L dots is "2", a ratio of the M dots is "2", and a ratio of the S dots is "1". Thus, twenty-two L dots, twenty-three M dots, and eleven S dots (a dot total concentration value="10455") are calculated as a constitution of the dots arranged in the pixel area.

When concentration values of the respective pixels in the pixel area are represented by 8 bits and 256 gradations, a maximum concentration value of the concentration values is a total concentration "16320" of an item with an average concentration value of "255" indicated by an arrow in FIG. 15 (*3). As a dot constitution ratio of the dots, a ratio of the L dots is "1", a ratio of the M dots is "0", and a ratio of the S dots is "0". Thus, all the L dots are calculated as a constitution of the dots arranged in the pixel area.

In FIGS. 9 to 15, total concentration values are only represented discontinuously. However, it goes without saying that it is unnecessary to interpolate and calculate total concentration values if a table including finer total concentration values is provided. In other words, it is unnecessary to select an actual number of dots of pixels with a total concentration value closest to an actual concentration total value. It is possible to directly refer to an actual number of dots in the table. Thus, in order to calculate a constitution ratio and an actual number of dots of set dots, there is a method of "directly referring to an actual number of dots in a table" other than a method of "selecting an actual number of dots of pixels with a total concentration value closest to an actual concentration total value" described above.

The dot arrangement order table storing unit 20 has stored therein at least one or more kinds of dot arrangement order tables 500 that designate an arrangement order of dots arranged in the pixel area. It is possible to read out and use a predetermined dot arrangement order table 500 as required.

The dot arranging unit 22 provides a function of arranging the dots of the dot constitution calculated by the dot constitution calculating unit 18 in the pixel area in accordance with the arrangement order of the dots designated in the dot arrangement order table 500 of the dot arrangement order table storing unit 20.

Figures 16A, 16B:
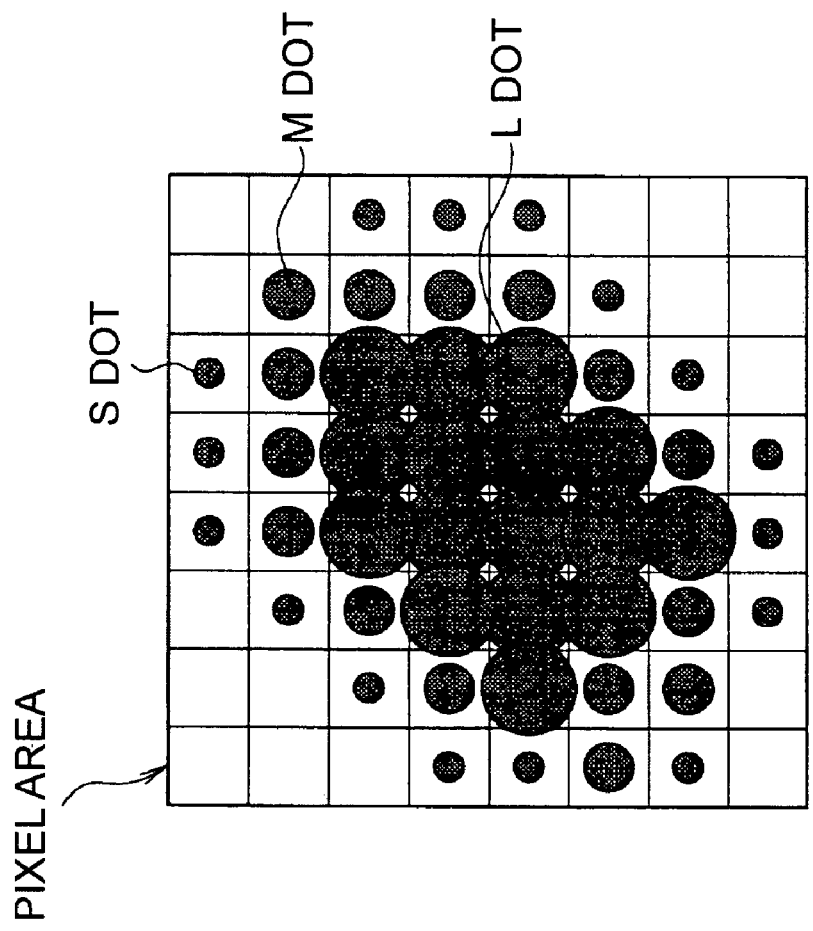
FIG. 16A is a diagram showing an example of a dot arrangement order table.
FIG. 16B is a diagram showing a pixel area in which dots are actually arranged in accordance with the dot arrangement order table.

In this embodiment, two kinds of dot arrangement order tables 500a and 500b shown in FIGS. 16A and 17 are stored in the dot arrangement order table storing unit 20. One or both of the dot arrangement order tables 500a and 500b are read out as required and used for each of pixel areas.

Respective squares of the dot arrangement order table 500a shown in FIG. 16A correspond to respective pixels in the pixel area. Numbers in the respective squares indicate an arrangement order of dots. Therefore, the dot arranging unit 22 arranges sixteen L dots, fifteen M dots, and fifteen S dots (with a dot constitution ratio of "1":"1":"1") in accordance with the dot arrangement order table 500a in FIG. 16A. As a result, as shown in FIG. 16B, the dots are arranged to be concentrated in an elliptical shape slanting in an obliquely right direction around the center of the pixel area. In arranging the respective dots in accordance with the numbers of the dot arrangement order table 500a, the dot arranging unit 22 preferentially arranges the dots in order from an L dot having a largest concentration value.

Similarly, respective squares of the dot arrangement order table 500b shown in FIG. 17 correspond to respective pixels in the pixel area. Numbers in the respective squares indicate an arrangement order of dots. Therefore, the dot arranging unit 22 arranges sixteen L dots, fifteen M dots, and fifteen S dots (with a dot constitution ratio of "1":"1":"1") in accordance with the dot arrangement order table 500b in FIG. 17. As a result, although not specifically shown in the figure, the dots are arranged to be concentrated in a swirl shape around the center of the pixel area.

In the above explanation concerning the dot arrangement order, the dots are arranged around the center of the pixel area. The "center" in this context means a center of gravity position of the pixel area or a position closest to the center of gravity position.

A method of calculating a center of gravity position of a pixel area will be explained with reference to FIG. 18.

As shown in the figure, assuming a pixel area including 8×8 pixels, if respective pixels a[i,j] in the pixel area is represented by vectors (i,j) (a[i,j]=(i,j)), vectors from a pixel a[0,0] at an upper left corner to a pixel a[7,7] at a lower right corner of the pixel area are represented as (0,0) to (7,7). Here, i of (i,j) indicates a real number and j indicates an imaginary number.

If vector values of the respective pixels in the pixel area are calculated in this way, it is possible to calculate a center of gravity of the pixel area according to Expression (1) below.

$$\vec{A} = \frac{1}{N \times M} \sum_{i=0}^{N} \sum_{j=0}^{M} a[i,j] \quad \text{Expression (1)}$$

When N=8, M=8, i=0 to 7, and j=0 to 7 are substituted in Expression (1), a center of gravity position is calculated as follows.

{(0,0)+(1,0)+ . . . +(7,7)}/(8×8)=(3.5, 3.5)

Therefore, it is seen that the center of gravity position (3.5, 3.5) is a position in the middle between a(0,0) at the upper left corner and a(7,7) at the lower right corner and is the center of the pixel area.

The print data generating unit 24 provides a function of generating print data by combining the respective pixel areas in which the dots are arranged by the dot arranging unit 22. The print data generating unit 24 sends the print data generated to the printing unit 26.

The printing unit 26 is an ink jet printer that ejects inks in a dot shape from respective nozzles of the nozzle modules 50, 52, 54, and 56 formed in the print head 200 while moving one or both of a print medium (sheet) S and the print head 200 to form a predetermined image including a large number of dots on the print medium S. The printing unit 26 includes, other than the print head 200, publicly-known components such as a not-shown print head moving mechanism (in the case of the multi-path printer) for causing the print head 200 to reciprocate on the print medium S in a width direction thereof, a not-shown sheet feeding mechanism for moving the print medium S, and a not-shown print controller mechanism for controlling ejection of inks by the print head 200 on the basis of the print data.

The pixel area dot constitution tables 400 shown in FIGS. 8 to 15 are created using Excel (registered trademark) that is spreadsheet software of Microsoft Corporation. FIG. 19 is a diagram showing an example of an actual number of dots calculating method for the pixel area dot constitution table 400. A constitution ratio of dot types is set such that a total value of respective dot sizes does not exceed a total number of pixels of a pixel area.

An example of the calculating method in FIG. 19 will be hereinafter explained.

B4(=RL)=ROUND(A4*$B$3/($B$2*$B$3+ $C$2*$C$3+$D$2*$D$3),0)

C4(=RM)=IF($C$2*$C$3+$D$2*$D$3>0, ROUND((A4-B4*$B$2)*$C$3/($C$2*$C$3+ $D$2*$D$3), 0),0)

D4(=RS)=IF(ROUND((A5·B5*$B$2·C5*$C$2)/$D$2,0) <0,

0,ROUND((A5·B5*$B$2·C5*$C$2)/$D$2,0))

dL: L dots

Concentration value (=255)

dM: M dot concentration value (=170)

dS: S dot concentration value (=85)

rL: L dot constitution ratio (input value)

rM: M dot constitution ratio (input value)

rS: S dot constitution ratio (input value)

LU: Total concentration value of the pixel area (calculation value)

RL: Actual number of dots for L dots (output value)

RM: Actual number of dots for M dots (output value)

RS: Actual number of dots for S dots (output value)

$: Absolute reference

Figure 2:
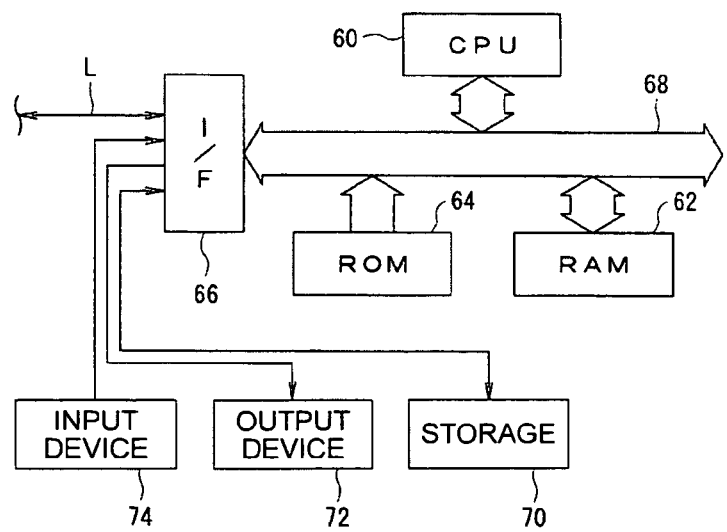
FIG. 2 is a block diagram showing a hardware configuration of a computer system that realizes the printing apparatus.

The printing apparatus 100 in this embodiment having the constitution described above includes a computer system for realizing various kinds of control for printing and the image data acquiring unit 10, the image data dividing unit 12, the total of pixel-area-concentration-values calculating unit 14, the pixel area dot constitution table storing unit 16, the dot constitution calculating unit 18, the dot arrangement order table storing unit 20, the dot arranging unit 22, the print data generating unit 24, the printing unit 26, and the like on software. As a hardware configuration of the computer system, as shown in FIG. 2, a Central Processing Unit (CPU) 60 serving as a central processor that bears various kinds of control and arithmetic processing, a Random Access Memory (RAM) 62 constituting a main storage, and a Read Only Memory (ROM) 64 serving as a storage device dedicated to readout are connected by various kinds of internal and external buses 68 including a Peripheral Component Interconnect (PCI) bus and an Industrial Standard Architecture (ISA) bus. An external storage (secondary storage) 70 such as a Hard Disk Drive (HDD), an output device 72 such as the printing unit 20, a CRT, or an LCD monitor, an input device 74 such as an operation panel, a mouse, a keyboard, or a scanner, a network L for communicating with a not-shown print instructing device, and the like are connected to the bus 68 via an input/output interface (I/F) 66.

When a power supply is turned on, a system program such as BIOS stored in the ROM 64 or the like loads various dedicated computer programs or various dedicated computer programs to the RAM 62. The computer programs are stored in the ROM 64 in advance. The various dedicated computer programs are installed in the storage 70 via a storage medium such as a CD-ROM, a DVD-ROM, or a Flexible Disk (FD) or via the communication network L such as the Internet. The CPU 60 performs predetermined control and arithmetic processing making full use of various resources in accordance with commands described in the programs loaded to the RAM 62. Consequently, it is possible to realize the functions of the respective units described above on the software.

An example of a flow of print processing using the printing apparatus 100 having such a constitution will be explained with reference to a flowchart in FIG. 20.

In general, the print head 200 for printing dots as described above can substantially simultaneously print plural kinds of colors such as four colors or six colors. However, in the example explained below, for ease understanding of explanation, it is assumed that all dots are printed by the print head 200 for one color (single color) (a monochrome image).

Figure 20:
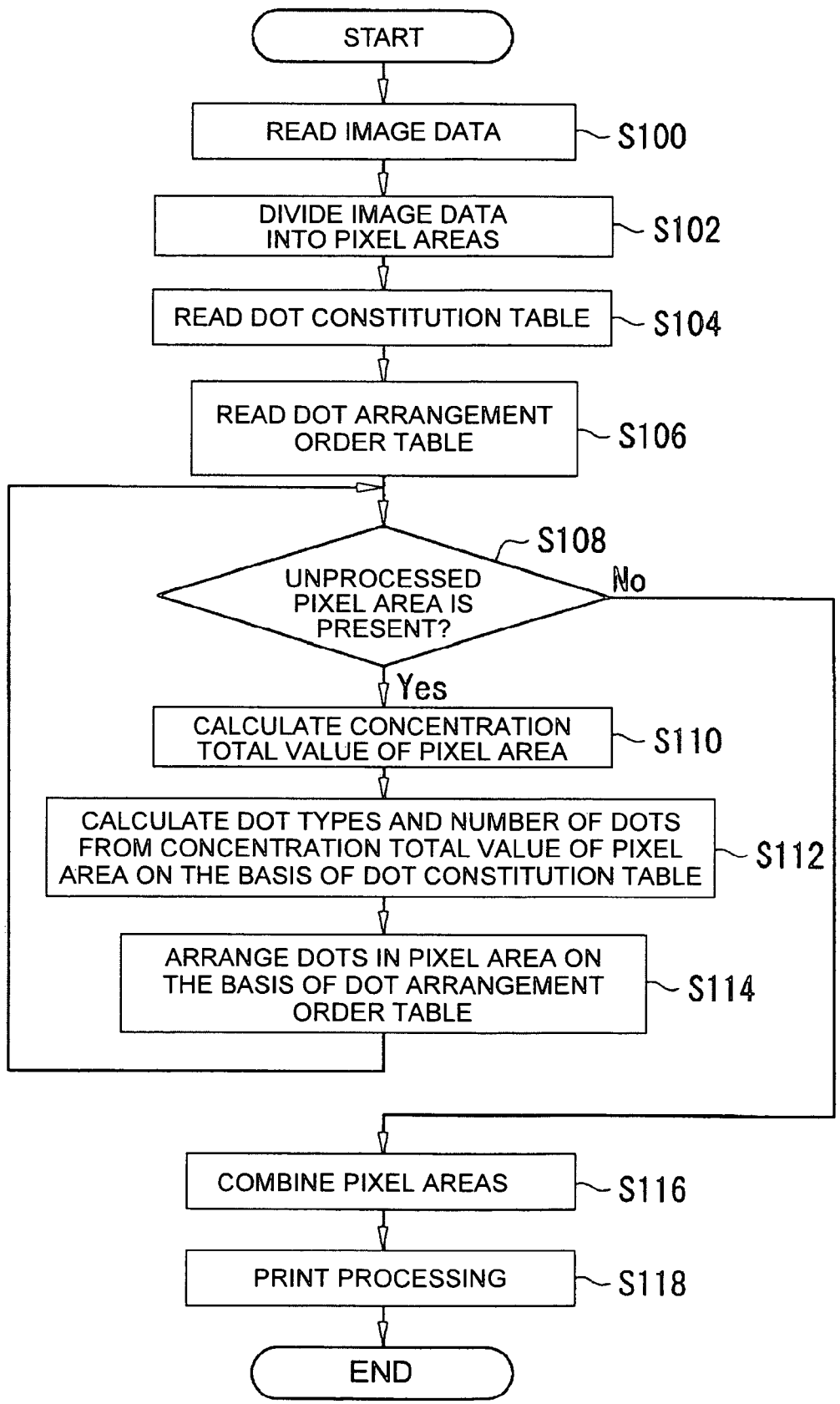
FIG. 20 is a flowchart showing an example of a flow of processing by the printing apparatus according to the embodiment of the invention.

As shown in the flowchart in FIG. 20, first, after the power supply is turned on, when a predetermined initial operation for print processing ends, the printing apparatus 100 shifts to first step S100. When a not-shown print instructing terminal such as a personal computer is connected to the printing apparatus 100, the printing apparatus 100 acquires multi-valued (256 gradations) image data with the image data acquiring unit 10. The printing apparatus 100 shifts to step S102 and divides the image data acquired into a large number of pixel areas with the image data dividing unit 12. For example, as described above, when the acquired image data includes 720×720 pixels and pixel areas into which the image data is divided have a size of 8×8 pixels, the image data is divided into "255" pixel areas.

After dividing the image data into the large number of pixel areas in this way, the printing apparatus 100 shifts to step S104 and reads a predetermined pixel area dot constitution table 400 stored by the dot constitution table storing unit 16. Subsequently, the printing apparatus 100 shifts to step S106 and reads the dot arrangement order table 500 also stored by the dot arrangement order table storing unit 20.

In the next judgment step S108, the printing apparatus 100 determines whether a predetermined pixel area is to be processed. If so, the printing apparatus 100 shifts to step S110 and calculates a total concentration value of the pixel area by totaling concentration values of all pixels in the pixel area with the total of pixel-area-concentration-values calculating unit 14. The printing apparatus 100 shifts to step S112.

In step S112, the printing apparatus 100 calculates types of dots arranged in the pixel area and the number of the dots from the total concentration value of the pixel area on the basis of the predetermined pixel area dot constitution table 400 with the dot constitution calculating unit 18. For example, when it is assumed that the total concentration value of the pixel area is "9800", since a total concentration value (9792) of an item with an average concentration value of "153" indicated by an arrow (*4) in FIG. 12 is closest to the total concentration value "9800", the printing apparatus 100 calculates a dot constitution ratio, dot types, and the number of dots of the pixel area in accordance with the item. According to the item indicated by the arrow (*4) in FIG. 12, a dot constitution ratio set in the pixel area is L dots "2":M dots "2":S dots "1", an actual number is "21", "21", and "10" for the L dots, the M dots, and the S dots, respectively, and a total number of the dots is "52".

When the dot types and the number of dots for the predetermined pixel area are calculated in this way, the printing apparatus 100 shifts to step S114. The printing apparatus 100 arranges, with the dot arranging unit 22, those dots in the pixel area on the basis of the predetermined dot arrangement order table 500 already read in step S106.

FIGS. 21 to 27 are diagrams showing examples of arrangement of the dots in step S114. The dot arrangement order table 500 adopted in these examples is the dot arrangement order table 500a based on which dots are arranged to be concentrated in an elliptical shape slanting in an obliquely right direction around the center of the pixel area as shown in FIG. 16A.

Figure 21:
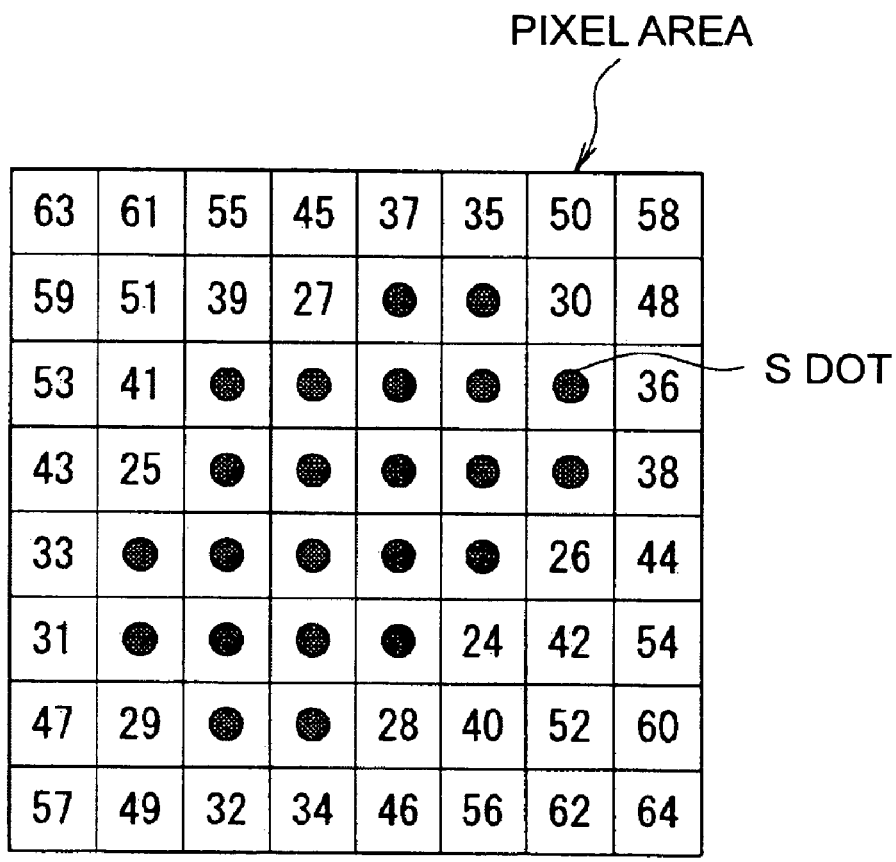
FIG. 21 is a diagram showing an example of actual dot arrangement based on a dot arrangement order table.

FIG. 21 is a diagram showing an example of dot arrangement in the case in which a concentration value total is "1920", a dot constitution ratio is L dots "0":M dots "0":S dots "1", and an actual number of dots is "0", "0", and "23" for the L dots, the M dots, and the S dots, respectively. The twenty-three S dots are arranged to be concentrated so as to spread in an elliptical shape in the obliquely right direction around the center of the pixel area.

Figure 22:
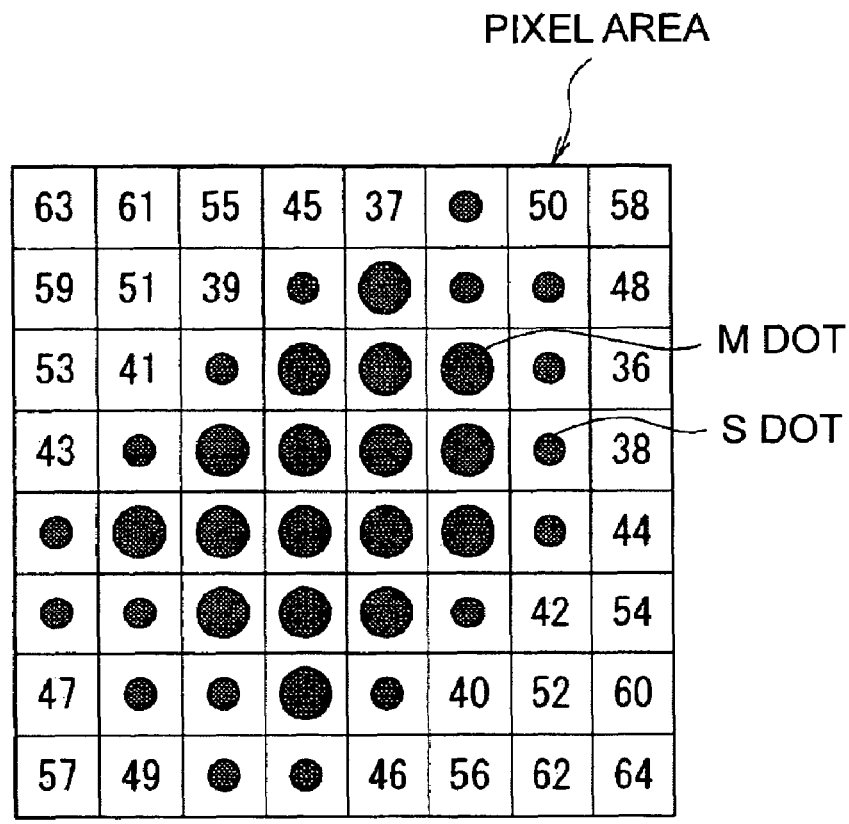
FIG. 22 is a diagram showing an example of actual dot arrangement based on the dot arrangement order table.

FIG. 22 is a diagram showing an example of dot arrangement in the case in which a concentration value total is "4480", a dot constitution ratio is L dots "0":M dots "1":S dots "1", and an actual number of dots is "0", "18", and "17" for the L dots, the M dots, and the S dots, respectively. The eighteen M dots and the seventeen S dots are arranged to be concentrated preferentially in order from the M dots so as to spread in an elliptical shape in the obliquely right direction around the center of the pixel area.

FIG. 23 is a diagram showing an example of dot arrangement in the case in which a concentration value total is "6400", a dot constitution ratio is L dots "0":M dots "2":S dots "1", and an actual numbers of dots is "0", "30", and "15" for the L dots, the M dots, and the S dots, respectively. The thirty M dots and the fifteen S dots are arranged to be concentrated preferentially in order from the M dots so as to spread in an elliptical shape in the obliquely right direction around the center of the pixel area.

Figure 24:
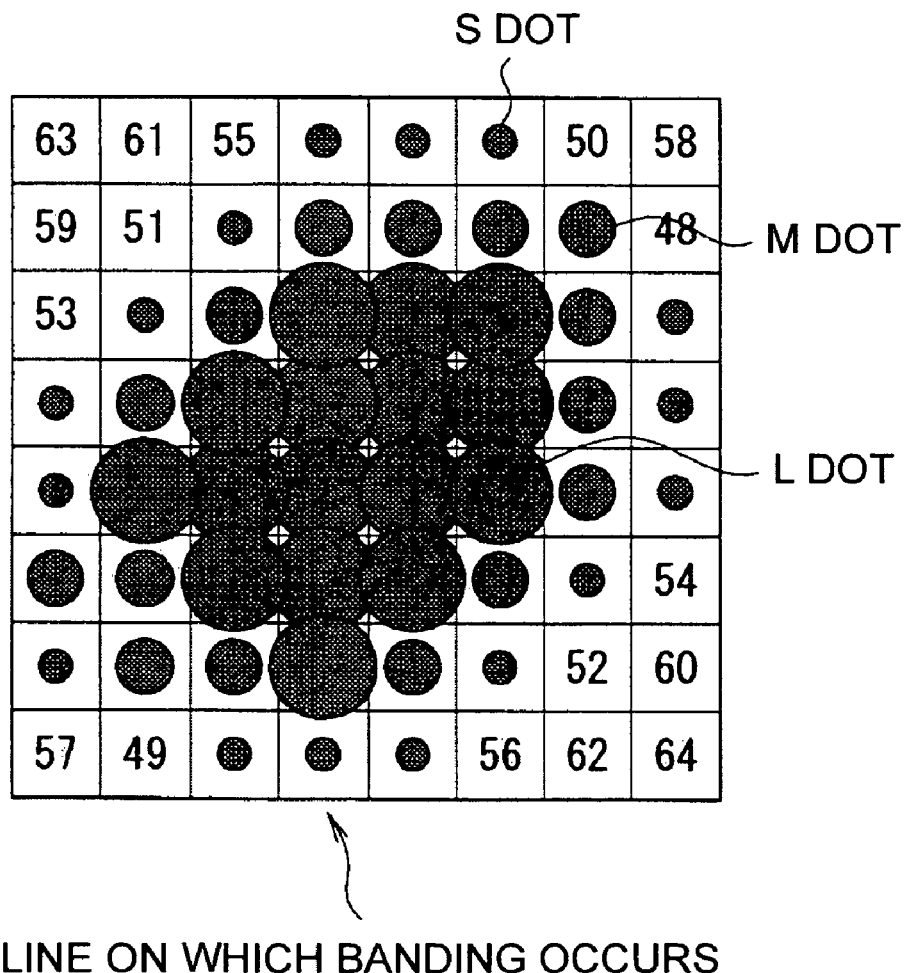
FIG. 24 is a diagram showing an example of actual dot arrangement based on the dot arrangement order table.

FIG. 24 is a diagram showing an example of dot arrangement in the case in which a concentration value total is "8000", a dot constitution ratio is L dots "1":M dots "1":S dots "1", and an actual number of dots is "16", "15", and "16" for the L dots, the M dots, and the S dots, respectively. The sixteen L dots, the fifteen M dots, and the sixteen S dots are arranged to be concentrated preferentially in order from the L dots so as to spread in an elliptical shape in the obliquely right direction around the center of the pixel area. In other words, in the example in FIG. 24, the dots are arranged such that a concentration is the highest in the center of the pixel area and gradually decreases toward the periphery of the elliptical shape.

Figure 25:
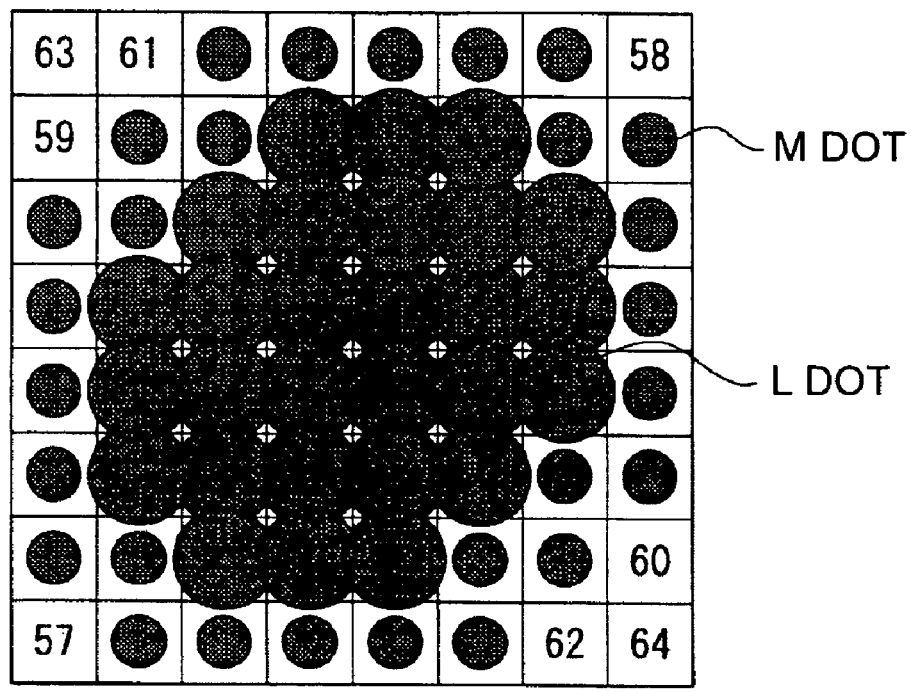
FIG. 25 is a diagram showing an example of actual dot arrangement based on the dot arrangement order table.

FIG. 25 is a diagram showing an example of dot arrangement in the case in which a concentration value total is "11840", a dot constitution ratio is L dots "1":M dots "1":S dots "0", and an actual number of dots is "28", "28", and "0" for the L dots, the M dots, and the S dots, respectively. The twenty-eight L dots and the twenty-eight M dots are arranged to be concentrated preferentially in order from the L dots so as to spread in an elliptical shape in the obliquely right direction around the center of the pixel area.

Figure 26:
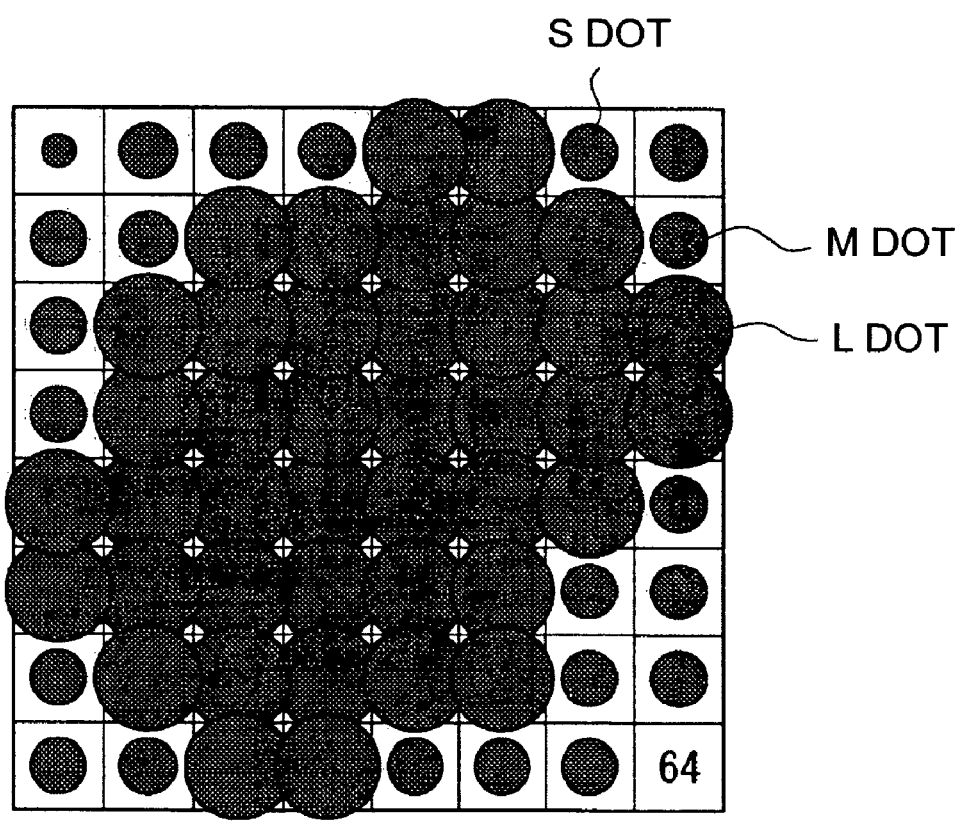
FIG. 26 is a diagram showing an example of actual dot arrangement based on the dot arrangement order table.

FIG. 26 is a diagram showing an example of dot arrangement in the case in which a concentration value total is "14080", a dot constitution ratio is L dots "2":M dots "1":S dots "0", and an actual number of dots is "41", "21", and "1" for the L dots, the M dots, and the S dots, respectively. The forty-one L dots, the twenty-one M dots, and the one S dot are arranged to be concentrated preferentially in order from the L dots so as to spread in an elliptical shape in the obliquely right direction around the center of the pixel area.

Figure 27:
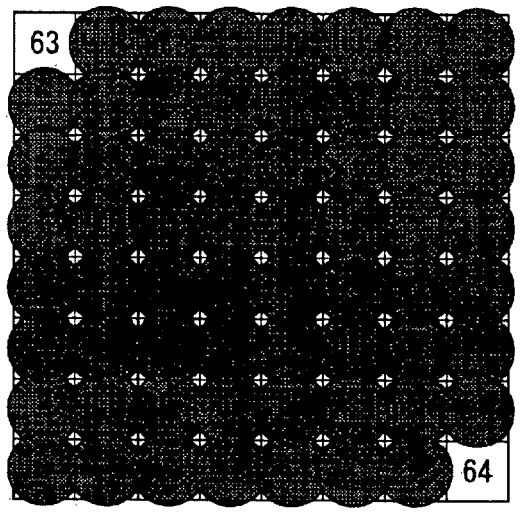
FIG. 27 is a diagram showing an example of actual dot arrangement based on the dot arrangement order table.
Figure 28:
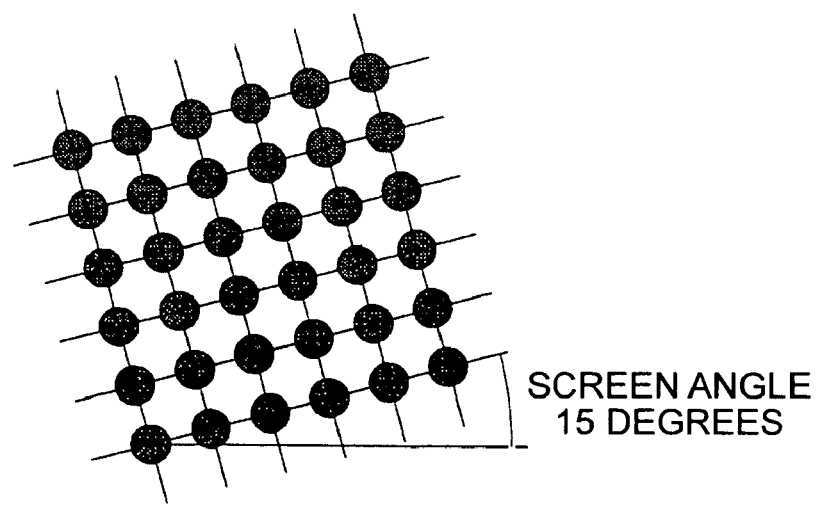
FIG. 28 is a diagram showing a pixel area for cyan at the time when a screen angle is set to 15°.
Figure 29:
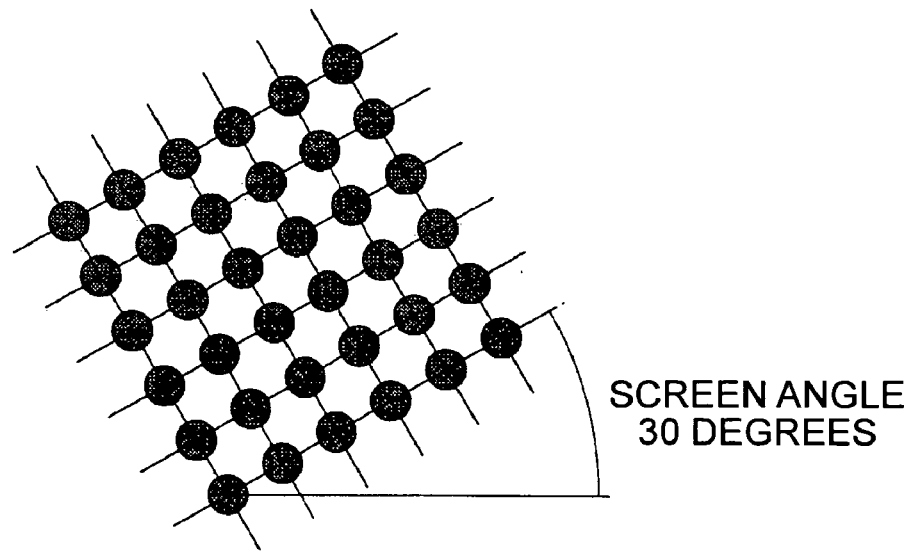
FIG. 29 is a diagram showing a pixel area for yellow at the time when a screen angle is set to 30°.
Figure 30:
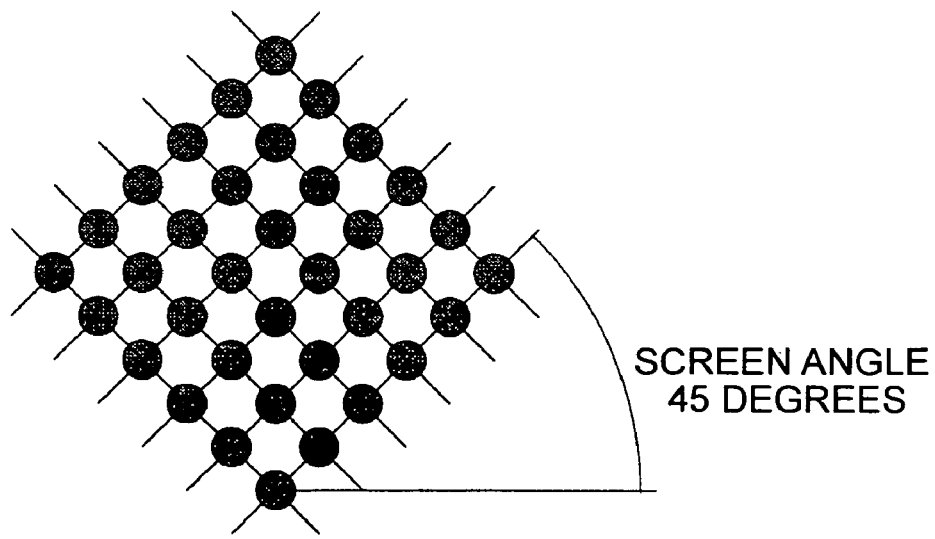
FIG. 30 is a diagram showing a pixel area for black at the time when a screen angle is set to 45°.
Figure 31:
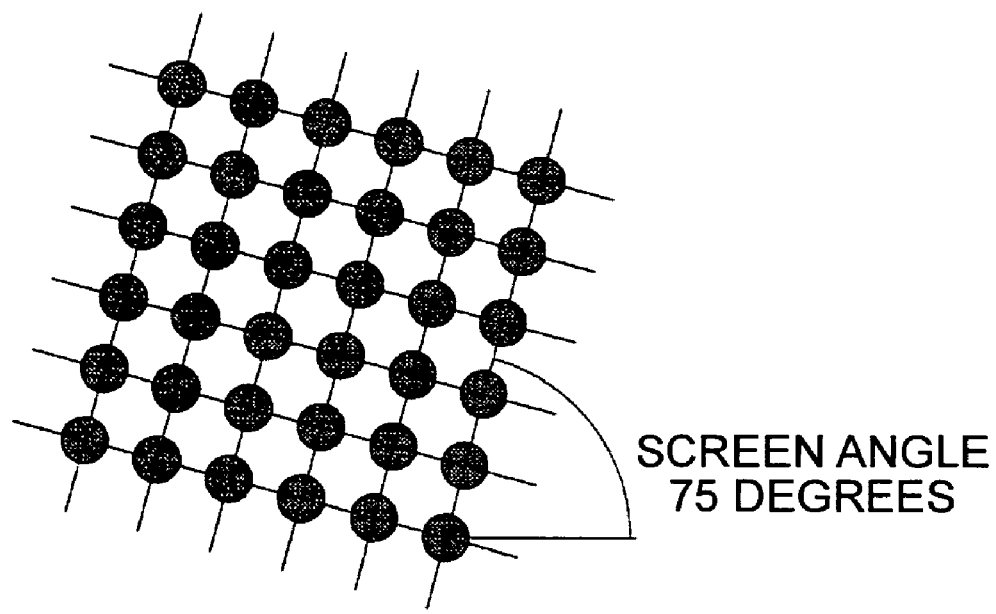
FIG. 31 is a diagram showing a pixel area for magenta at the time when a screen angle is set to 75°.

FIG. 27 is a diagram showing an example of dot arrangement in the case in which a concentration value total is "15744", a dot constitution ratio is L dots "1":M dots "0":S dots "0", and an actual number of dots is "62", "0", and "0" for the L dots, the M dots, and the S dots, respectively. Only the sixty-two L dots are arranged to be concentrated so as to spread in an elliptical shape in the obliquely right direction around the center of the pixel area.

Referring back to the flow in FIG. 20, when the dot arrangement processing for the predetermined pixel area ends in this way, returning to step S108, the printing apparatus 100 judges whether there is another unprocessed pixel area. When there is another unprocessed pixel area (Yes in step S108), the printing apparatus 100 repeats the processing from steps S110 to S114. When it is judged that there is no more unprocessed pixel area (No in step S108), the printing apparatus 100 shifts to step S116 and combines, using the print data generating unit 24, all the pixel areas to create print data in which predetermined dot sizes are set for the respective pixels. Thereafter, the printing apparatus 100 shifts to the last step S118 and executes, with the printing unit 26, printing using the print head 20. Consequently, the print processing ends.

As described above, the printing apparatus 100 according to this embodiment divides multi-gradation image data into pixel areas, calculates a concentration total value of each of the pixel areas, calculates a dot constitution in the pixel area from the concentration total value, and concentrated dots in the center of the pixel area preferentially in order from largest dots. Consequently, even if dot print deviation due to the flight deviation phenomenon occurs in the pixel area, the dot print deviation becomes less conspicuous. Thus, it is possible to eliminate the banding phenomenon such as a white streak or a thick streak or make the banding phenomenon practically inconspicuous.

For example, when the flight deviation phenomenon occurs on the fourth line from the left as shown in FIG. 24, if concentration values of original pixels are directly subjected to dot conversion, the banding phenomenon such as a white streak or a thick streak occurs near the pixels to significantly deteriorate image quality. However, as shown in the figure, when dots are arranged to be concentrated preferentially in order from largest dots in the center of the pixel area, even if some print deviation occurs, overlapping sections of the dots absorb the print deviation. This makes it possible to prevent or significantly control the occurrence of the banding phenomenon such as a white streak or a thick streak near the pixels.

As described above, a total concentration value in each of the pixel areas after the dot arrangement is substantially equal to an original total concentration value and an input concentration value and an output concentration value easily coincide with each other. This makes it possible to prevent deterioration of image quality due to a change in concentration and display excellent gradation reproducibility in, in particular, a gradation image.

Moreover, since it is possible to freely set (reduce) a pixel area size according to division processing, the pixel area becomes inconspicuous. This makes it possible to obtain a high-quality print.

In this embodiment, as described in FIG. 20, the pixel area division processing for image data is performed after the image data reading processing in step S100. However, the division processing may be performed after the dot constitution table reading processing in step S104 or after the dot arrangement order table reading processing in step S106.

In arranging the dots with the dot arranging unit 22, if the dots are arranged after irregularly rotating specified dot arrangement at a fixed angle, for example, by 90°×I (an integer equal to or larger than 0), it is possible to exclude periodicity among the pixel areas. This makes it possible to attain improvement of image quality in, in particular, identical concentration parts.

In combining the respective pixel areas using the print data generating unit 24, if the respective pixel areas are combined after being irregularly rotated at a fixed angle, for example, by 90°×I (an integer equal to or larger than 0) in the same manner as above, it is possible to obtain the same effect.

As in the case of color image data, when dots of plural colors, for example, four colors of C, M, Y, and K in one pixel area are printed, as shown in FIGS. 28 to 31, if a screen angle is shifted by 15° for each of the colors to set the screen angle to 15° for cyan, 30° for yellow, 45° for black, and 75° for magenta, it is possible to prevent the moiré phenomenon in printing a color image or the like. This makes it possible to obtain a high-quality color print.

The technique itself for forming dots of different sizes according to parts of an image in one print as described above is a publicly-known technique in the past. In particular, the technique is frequently used in obtaining a print for which a printing speed and a printed image quality are realized in a well-balanced state. In other words, whereas a high image quality is obtained by setting a dot size small, high performance is required in machine accuracy when the dot size is set small. Further, it is necessary to form a large number of dots in order to form a solid image with small dots. Thus, a printing speed and image quality are realized in a well-balanced state by using the technique for forming dots of different sizes according to parts of an image, for example, setting a dot size small in a high-definition image part and setting a dot size large in a solid image part.

As a technical method for realizing formation of dots of different sizes according to parts of an image, for example, in the case of a system using a piezo actuator in the print head 200, it is possible to easily realize the method by changing a voltage applied to the piezo actuator to control an ejection amount of inks.

As the different sizes of dots formed by the print head 200 in the embodiment of the invention and a usual print head according to parts of an image, as shown in FIG. 7, four patterns of a "large dot", a "medium dot", a "small dot", and "no dot" are generally used. However, the dot sizes are not limited to these. At least two patterns other than "no dot" only have to be provided. It is preferable that there are a larger number of patterns.

The image data acquiring unit 10, the image data dividing unit 12, the total of pixel-area-concentration-values calculating unit 14, the pixel area dot constitution table 400, the pixel area dot constitution table storing unit 16, the dot constitution calculating unit 18, the dot arrangement order table 500, the dot arrangement order table storing unit 20, the dot arranging unit 22, the print data generating unit 24, the printing unit 26, the print head 200, and the like in this embodiment correspond to the image data acquiring unit, the image data dividing unit, the total of pixel-area-concentration-values calculating unit, the pixel area dot constitution table, the pixel area dot constitution table storing unit, the dot constitution calculating unit, the dot arrangement order table, the dot arrangement order table storing unit, the dot arranging unit, the print data generating unit, the printing unit, the print head, and the like in the printing apparatus according to the first aspect of the invention described in the section of the summary of the invention, respectively.

As a characteristic of this embodiment of the invention, dots are arranged to be concentrated on the basis of a total concentration value in a pixel area without substantially altering the existing print head 200 and printing unit 26 themselves. Thus, it is unnecessary to specifically prepare dedicated units as the print head 200 and the printing unit 26. It is possible to utilize the existing print head 200 and printing unit 26 (printer) of the ink jet system as they are.

Therefore, if the print head 200 and the printing unit 26 are separated from the printing apparatus 100 in this embodiment, it is possible to realize the functions of the printing apparatus 100 only with a general purpose information processing apparatus (image processing apparatus) such as a personal computer.

It goes without saying that it is possible to apply the invention not only to the flight deviation phenomenon but also to the case in which, although an ejecting direction of inks is vertical (normal), since nozzle forming positions deviate from regular positions, dots are formed in the same manner as those affected by the flight deviation phenomenon. It is also possible to apply the invention to, for example, a deficiency that is caused when an ink is not ejected from a specific nozzle because of ink clogging or the like.

As a pixel area dot constitution table that is used when there are plural kinds of predetermined pixel areas, a table shown in FIG. 32 is conceivable.

The table shown in FIG. 32 specifies, according to a total concentration value of respective pixels in a pixel area, a set bit ratio for respective dot sizes (L (large), M (medium), and S (small)) in the pixel area. In addition, the table specifically specifies the number of dots (an actual number of dots) actually arranged according to the set bit ratio and a total of actual numbers of dots.

This table is an example in the case of 16 (4×4) pixels. When a concentration value average of respective pixels in a pixel area is "0 (8 bits and 256 gradations)", a total concentration value in the pixel area is "0" and all of a dot ratio, an actual number of dots, a total of actual numbers of dots in the pixel area are "0". When a concentration value average of respective pixels in a pixel area is "30", a total concentration value in the pixel area is "480". As a set dot ratio in the pixel area, a ratio of L size dots is "0", a ratio of M size dots is "0", and a ratio of S size dots is "1". An actual number of dots in the pixel area is "0" for the L size dots and the M size dots and is "6" only for the S size dots. A total of actual numbers of dots in the pixel area is "6". In other words, when the concentration value average of the respective pixels is "30", a total concentration in the pixel area is represented by only six dots.

Similarly, when a concentration value average of the respective pixels in the pixel area is "70", a total concentration value in the pixel area is "1120". As a set dot ratio in the pixel area, a ratio of L size dots is "0", a ratio of M size dots is "1", and a ratio of S size dots is "1". An actual number of dots in the pixel area is "0" for the L size dots, "4" for and the M size dots, and "5" for the S size dots. A total of actual numbers of dots in the pixel area is "9". In other words, when the concentration value average of the respective pixels is "70", a total concentration in the pixel area is represented by nine dots.

In this way, for the cases in which a concentration value average of the respective pixels in the pixel area is "0, 30, 70, 100, 125, 185, 220, and 246", total concentration values, set dot ratios, actual numbers of dots, and total numbers of dots in the pixel area are calculated and complied as a table.

For example, when a pixel area is formed by two kinds of groups of pixels, that is, sixteen pixels and sixty-four pixels, N-arization is performed using the table explained with reference to FIG. 8 and the table explained with reference to FIG. 32.

Figure 35:
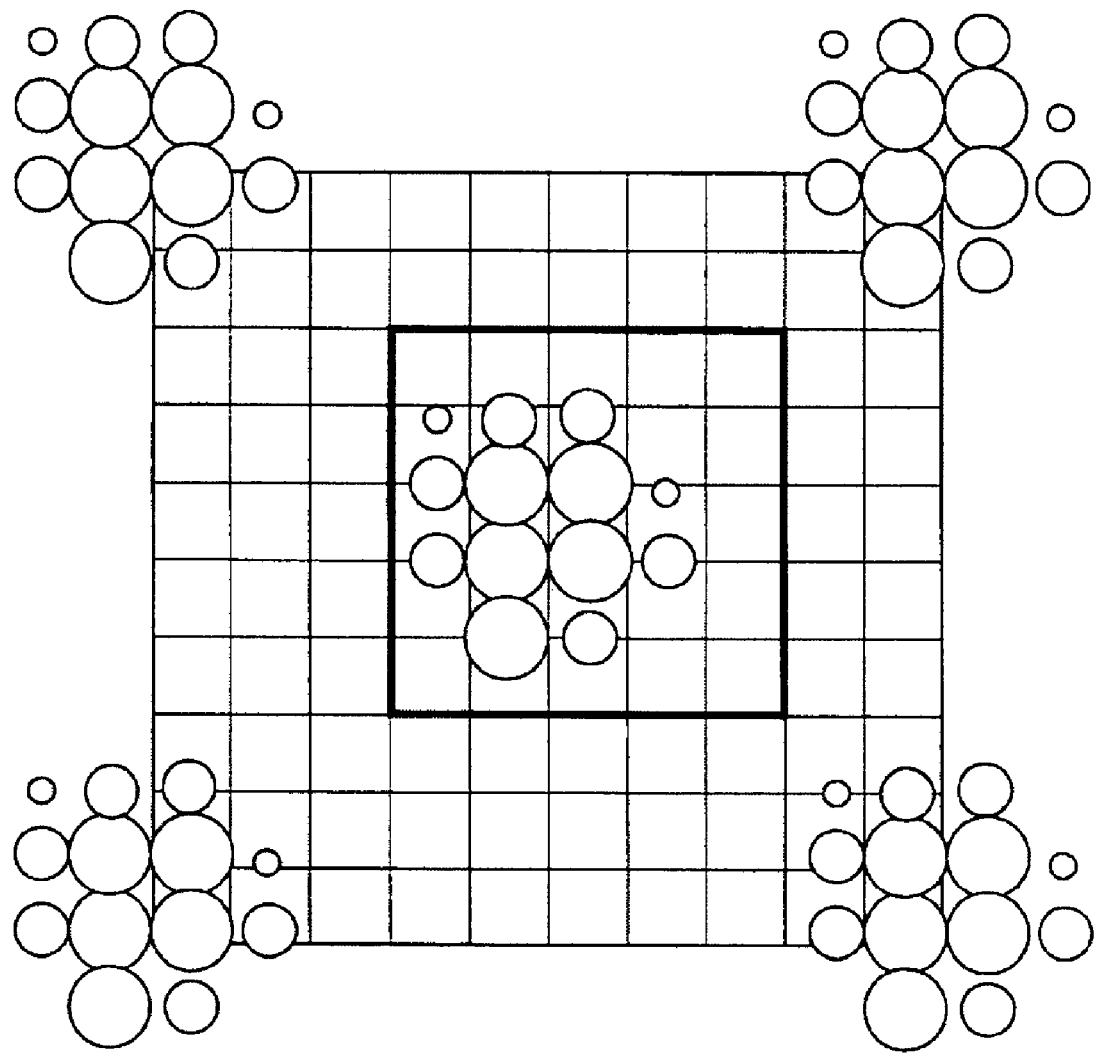
FIG. 35 is a diagram showing the concentrating dots in FIG. 33.

An embodiment in the case in which concentrating dots are not in the center of a predetermined pixel area will be explained with reference to FIGS. 33 to 35.

FIG. 33 is a diagram showing a dot arrangement order table in the embodiment in the case in which concentrating dots are not in the center of a predetermined pixel area.

A dot arrangement order table storing unit has stored therein at least one or more kinds of dot arrangement order tables that designate an arrangement order of dots arranged in a pixel area. It is possible to read out and use a predetermined dot arrangement order table as required.

The dot arranging unit 22 provides the pixel area with a dot constitution calculated by a dot constitution calculating unit in accordance with the arrangement order of dots designated by the dot arrangement order table. In this embodiment, two kinds of dot arrangement order tables shown in FIGS. 33 and 34 are stored in the dot arrangement order table storing unit. Both the dot arrangement order tables are read out and used for each of pixel areas as required.

Respective squares in the dot arrangement order table correspond to respective pixels in the pixel area and numbers in the respective squares indicate an arrangement order of dots. Therefore, in the case of FIG. 33, 1 to 4 of the arrangement order are placed at four corners and 25 as the last of the arrangement order is arranged in the center of the pixel area. Therefore, concentrating dots are not in the center of the pixel area. Therefore the dot arrangement order table is different from that in the embodiment described above. The dot arrangement order table in FIG. 34 includes four pieces of the dot arrangement order table in FIG. 33. As a result, concentrating dots in four places are shown in the center of the predetermined pixel area and parts other than the pixel center.

It is possible to apply the printing apparatus 100 in the embodiment of the invention not only to the line head ink jet printer but also to the multi-path ink jet printer. In the line head ink jet printer, it is possible to obtain, in one path, a high-quality print in which a white streak or a thick streak is practically inconspicuous even if the flight deviation phenomenon or the like occurs. In the multi-path ink jet printer, it is possible to reduce the number of times of reciprocating motions. This makes it possible to perform printing at higher speed than in the past. For example, when it is possible to realize a desired image quality in one printing, it is possible to reduce a printing time to 1/K of that in the case in which printing is performed by K times of reciprocating motions.

Figure 36A:
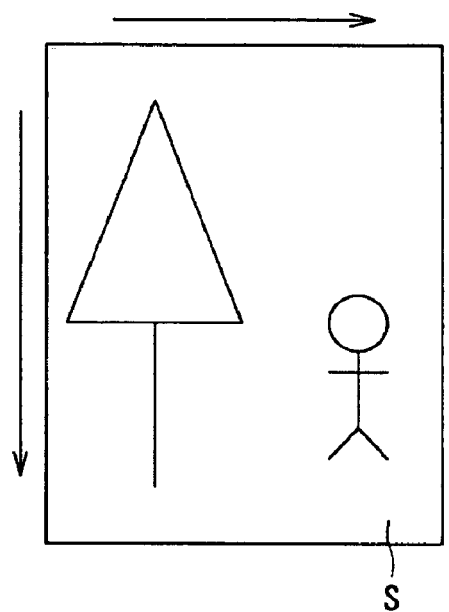
FIGS. 36A to 36C are diagrams for explaining a difference between a printing system by a multi-path ink jet printer and a printing system by a line head ink jet printer.
Figure 36B:
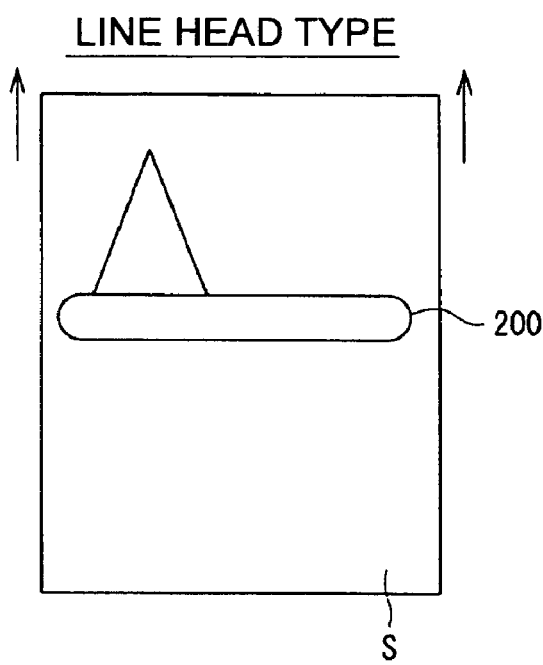
Figure 36C:
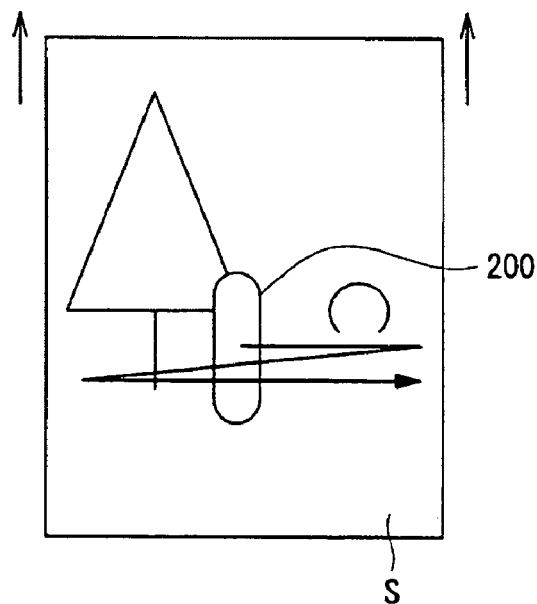

FIGS. 36A to 36C are diagrams showing printing systems by the line head ink jet printer and the multi-path ink jet printer.

As shown in FIG. 36A, it is assumed that a width direction of a rectangular printing sheet S is a main scanning direction of image data and a longitudinal direction of the printing sheet S is a sub-scanning direction of the image data. In the line head ink jet printer, as shown in FIG. 36B, the print head 200 has length equivalent to a paper width of the printing sheet S, the print head 200 is fixed, and printing is completed in a so-called one path (motion) by moving the printing sheet S in the sub-scanning direction with respect to the print head 200. As in a so-called flatbed scanner, it is also possible to perform printing while fixing the printing sheet S and moving the print head 200 in the sub-scanning direction or while moving both the printing sheet S and the print head 200 in opposite directions. On the other hand, as shown in FIG. 36C, the multi-path ink jet printer executes printing by placing the print head 200 far shorter than the length of the paper width in a direction orthogonal to the main scanning direction and moving the printing sheet S in the sub-scanning direction by a predetermined pitch at a time while causing the print head 200 to reciprocate in the main scanning direction many times. Therefore, the latter multi-path ink jet printer has a disadvantage that a longer printing time is required compared with the former line head ink jet printer. On the other hand, since it is possible to repeatedly place the print head 200 in arbitrary places, it is possible to take a certain degree of measures for reduction of, in particular, the white streak phenomenon in the banding phenomenon described above.

In this embodiment, the ink jet printer that ejects inks in a dot shape to perform printing is explained as an example. However, it is also possible to apply the invention to other printing apparatuses that use a print head of a form in which printing mechanisms are linearly arranged, for example, a thermal head printer called a thermal transfer printer, a thermal printer, or the like, a laser printer, and the like.

Figure 37:
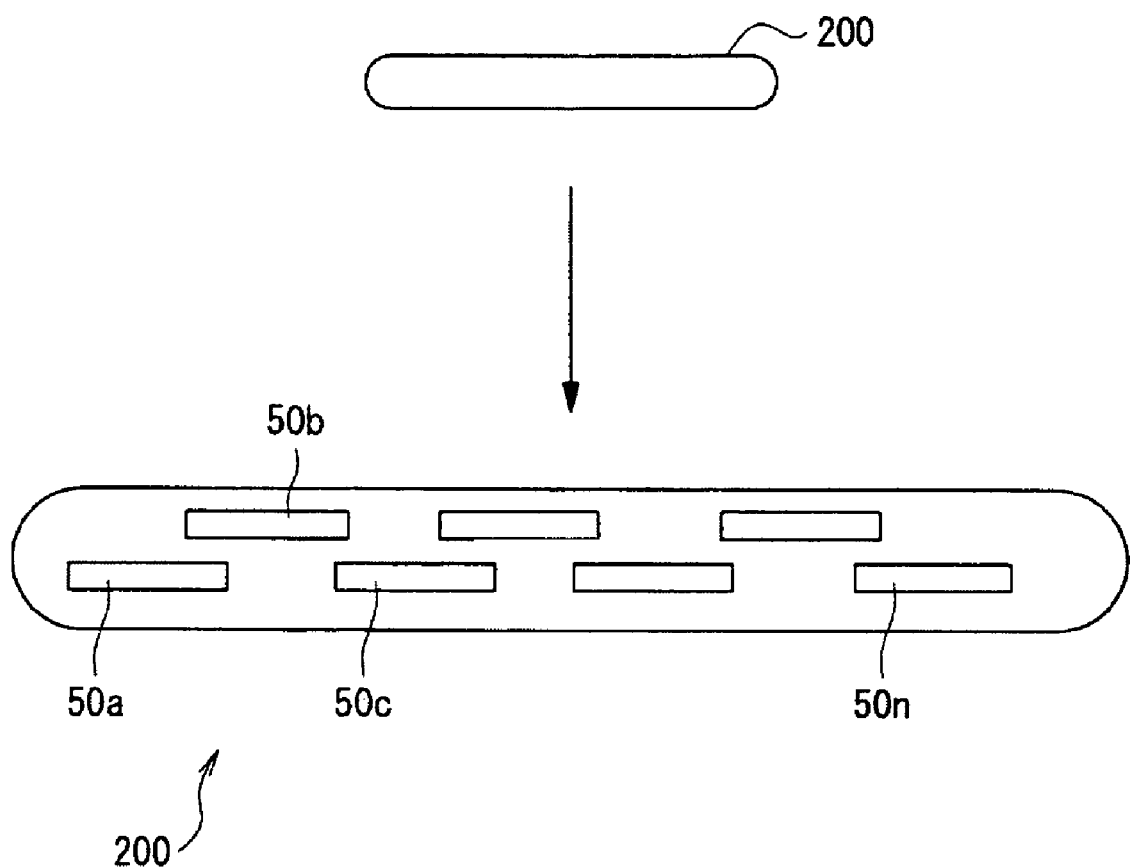
FIG. 37 is a conceptual diagram showing another example of the structure of the print head.

In FIG. 3, the respective nozzle modules 50, 52, 54, and 56 provided for the respective colors of the print head 200 take a form in which the nozzles N are linearly continuous in the longitudinal direction of the print head 200. However, as shown in FIG. 37, each of the nozzle modules 50, 52, 54, and 56 may be formed by plural short nozzle units 50a, 50b, . . . , and 50n and arranged in the front and the rear in a moving direction of the print head 200. In particular, when each of the nozzle modules 50, 52, 54, and 56 is formed by the plural short nozzle units 50a, 50b, . . . , and 50n in this way, a yield is significantly improved compared with the case in which the nozzle module is formed by long nozzle units.

Figure 38:
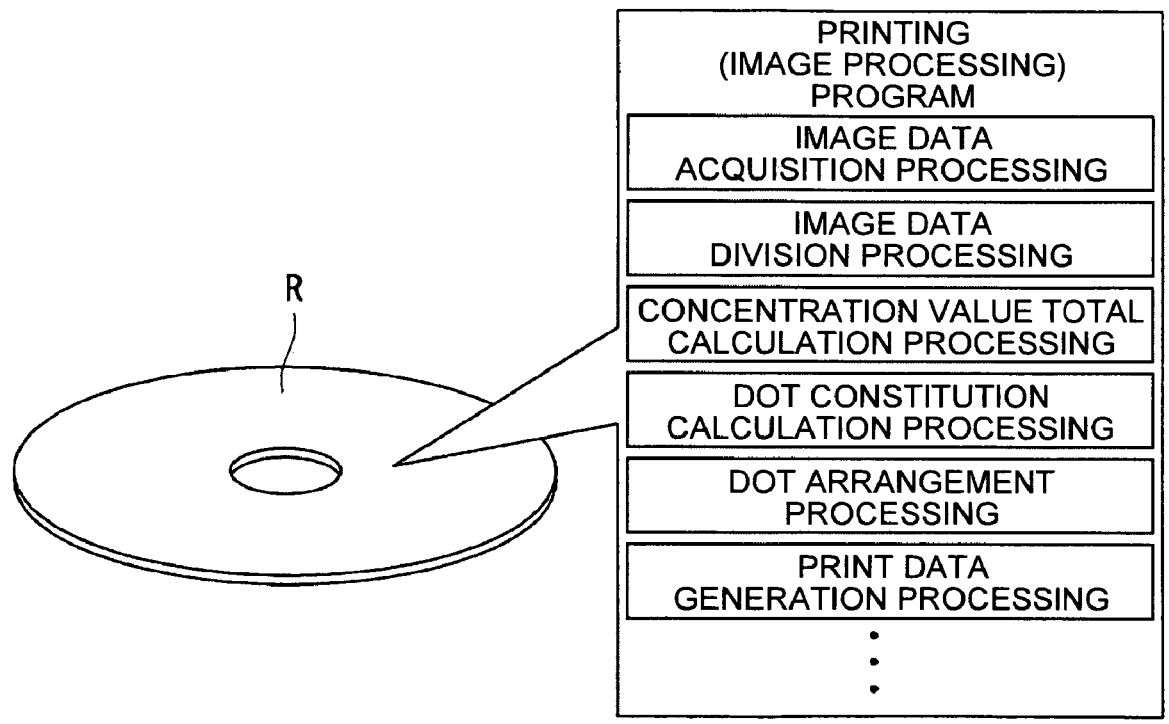
FIG. 38 is a conceptual diagram showing an example of a computer readable recording medium having recorded therein a program according to an embodiment of the invention.

It is possible to realize the respective units for realizing the printing apparatus 100 in the embodiment described above on software using a computer system built in almost all the existing printing apparatuses. It is possible to easily provide users and the like, who desire to acquire the computer program, with the computer program by delivering the same via a computer readable recording medium R such as a CD-ROM, a DVD-ROM, or an FD shown in FIG. 38 other than installing the computer program in a product in a state in which the same is stored in a semiconductor ROM in advance or delivering the computer program via a network such as the Internet.

What is claimed is:

1. A printing apparatus comprising:
   an image data acquiring unit that acquires multi-valued color image data;
   an image data dividing unit that divides the image data acquired by the image data acquiring unit into plural pixel areas;
   a calculating unit that calculates a total concentration value for each pixel area of the plural pixel areas divided by the image data dividing unit, the total concentration value being calculated by totaling concentration values for each of the pixels in a corresponding respective pixel area of the plural pixel areas divided by the image data dividing unit;
   a pixel area dot constitution table storing unit having stored therein a pixel area dot constitution table having the total concentration value for each of the pixel areas calculated by the calculating unit and a dot constitution corresponding to the total concentration value of the pixel area;
   a dot constitution calculating unit that calculates a constitution of dots arranged in the pixel area based on the pixel area dot constitution table;
   a dot arrangement order table storing unit having stored therein a dot arrangement order table that designates an arrangement order of the dots arranged in the pixel area;
   a dot arranging unit that arranges the dots having the dot constitution calculated by the dot constitution calculating unit in the pixel area in accordance with the arrangement order of the dots designated in the dot arrangement order table of the dot arrangement order table storing unit;
   a print data generating unit that generates print data by combining the respective pixel areas in which the dots are arranged by the dot arranging unit; and
   a printing unit that executes printing based on the print data generated by the print data generating unit.

2. The printing apparatus according to claim 1, wherein the dot constitution calculating unit calculates an actual number of dots for each dot size classified according to diameters of the dots.

3. The printing apparatus according to claim 1, wherein, in the dot arrangement order table stored in the dot arrangement order table storing unit, the dot arrangement order is designated such that the dots are arranged in order from a dot having a largest dot diameter in the pixel area to a smallest dot diameter in the pixel area.

4. The printing apparatus according to claim 1, wherein, in the dot arrangement order table stored in the dot arrangement order table storing unit, the dot arrangement order is designated such that the dots are arranged substantially in an elliptical shape in the pixel area.

5. The printing apparatus according to claim 1, wherein, in the dot arrangement order table stored in the dot arrangement order table storing unit, the dot arrangement order is designated such that the dots are arranged from a pixel closest to a center of the pixel area toward a periphery of the pixel area.

6. The printing apparatus according to claim 1, wherein, in the dot arrangement order table stored in the dot arrangement order table storing unit, the dot arrangement order is designated such that the dots are arranged over the plural pixel areas and arranged from a predetermined position in the plural pixel areas toward the periphery of the predetermined position.

7. The printing apparatus according to claim 1, wherein
the dot arrangement order table storing unit includes at least two dot arrangement order tables in which dot arrangement orders are different from one another, and
the dot arranging unit selects one dot arrangement order table out of the dot arrangement order tables stored in the dot arrangement order table storing unit and uses the selected dot arrangement order table.

8. The printing apparatus according to claim 1, wherein the pixel area dot constitution table in the pixel area dot constitution table storing unit designates a constitution ratio for each dot size corresponding to the total concentration value.

9. The printing apparatus according to claim 8, wherein when the total concentration value of the pixel area calculated by the calculating unit is equal to or lower than a predetermined concentration value, a total number of dots having sizes equal to or smaller than a predetermined size is set larger than a total number of dots having sizes equal to or larger than the predetermined size.

10. The printing apparatus according to claim 1, wherein the dot arranging unit arranges, in arranging the dots in accordance with the dot arrangement order table, the dots by rotating arrangement positions thereof at a predetermined angle around a center of the pixel area.

11. The printing apparatus according to claim 1, wherein the print data generating unit generates, when the multi-valued color image data acquired by the image data acquiring unit is image data formed of plural colors, print data by combining pixel areas for the respective colors after setting predetermined screen angles in the pixel areas for the respective colors.

12. The printing apparatus according to claim 1, wherein the printing apparatus comprises an ink jet printer that performs printing when a movable carriage body integrally provided with an ink cartridge and a print head ejects particles of liquid inks in a dot shape from nozzles of the print head while reciprocating over a print medium in a direction orthogonal to a sheet feeding direction of the print medium.

* * * * *